(12) United States Patent
Takano et al.

(10) Patent No.: US 12,114,106 B2
(45) Date of Patent: *Oct. 8, 2024

(54) LIGHT-SOURCE DEVICE AND IMAGE FORMING APPARATUS INCLUDING SAME

(71) Applicant: Ricoh Company, Ltd., Tokyo (JP)

(72) Inventors: Yohei Takano, Kanagawa (JP); Kazuhiro Fujita, Tokyo (JP); Kasumi Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,959

(22) Filed: Apr. 27, 2023

(65) Prior Publication Data
US 2024/0080419 A1 Mar. 7, 2024

Related U.S. Application Data

(63) Continuation of application No. 17/085,193, filed on Oct. 30, 2020, now Pat. No. 11,677,914.

(30) Foreign Application Priority Data

Nov. 1, 2019 (JP) ................................. 2019-200038

(51) Int. Cl.
G02B 27/10 (2006.01)
G02B 27/09 (2006.01)
(Continued)

(52) U.S. Cl.
CPC ....... *H04N 9/3158* (2013.01); *G02B 27/0977* (2013.01); *G02B 27/1006* (2013.01);
(Continued)

(58) Field of Classification Search
CPC .. H04N 9/3158; H04N 9/3152; H04N 9/3164; G02B 27/0977; G02B 27/1006;
(Continued)

(56) References Cited

U.S. PATENT DOCUMENTS 9,377,675 B2 6/2016 Matsubara
9,703,178 B2 7/2017 Tohara et al.
(Continued)

FOREIGN PATENT DOCUMENTS

CN 1501120 A 6/2004
CN 101324747 A 12/2008
(Continued)

OTHER PUBLICATIONS

Office Action issued May 30, 2023 in Japanese Patent Application No. 2019-200038, 15 pages.
(Continued)

*Primary Examiner* — Elmito Breval
(74) *Attorney, Agent, or Firm* — XSENSUS LLP

(57) ABSTRACT

A light-source device includes an excitation light source, an optical member, and a wavelength converter. The excitation light source is configured to emit first color light. The optical member has a reflecting surface configured to reflect the first color light emitted from the excitation light source. The wavelength converter includes a wavelength conversion member on which the first color light reflected by the optical member is incident. The wavelength conversion member is configured to convert at least part of the first color light into second color light having a wavelength different from a wavelength of the first color light and emit the second color light. A center of the first color light on the reflecting surface of the optical member does not intersect with a light flux of the first color light emitted from the wavelength converter.

19 Claims, 21 Drawing Sheets

(51) Int. Cl.
   *G02B 27/18*   (2006.01)
   *G03B 21/20*   (2006.01)
   *H04N 9/31*    (2006.01)

(52) U.S. Cl.
   CPC ......... *G02B 27/18* (2013.01); *G03B 21/2033* (2013.01); *G03B 21/2066* (2013.01); *H04N 9/3152* (2013.01); *H04N 9/3164* (2013.01)

(58) Field of Classification Search
   CPC .......................... G02B 27/18; G03B 21/2033; G03B 21/2066; G03B 21/2013; G03B 21/208; G03B 33/08
   See application file for complete search history.

(56) References Cited

U.S. PATENT DOCUMENTS

| | | |
|---|---|---|
| 2004/0119949 A1 | 6/2004 | Ito |
| 2011/0063581 A1 | 3/2011 | Iwanaga |
| 2012/0044465 A1 | 2/2012 | Murai et al. |
| 2012/0106178 A1 | 5/2012 | Takahashi et al. |
| 2013/0010264 A1 | 1/2013 | Takahashi et al. |
| 2014/0028983 A1 | 1/2014 | Fujita et al. |
| 2014/0071182 A1 | 3/2014 | Takahashi et al. |
| 2014/0071407 A1 | 3/2014 | Takahashi et al. |
| 2014/0071408 A1 | 3/2014 | Takahashi et al. |
| 2014/0139810 A1 | 5/2014 | Matsubara |
| 2014/0185017 A1 | 7/2014 | Tohara et al. |
| 2014/0268068 A1 | 9/2014 | Takahashi et al. |
| 2014/0268069 A1 | 9/2014 | Takahashi et al. |
| 2014/0340649 A1 | 11/2014 | Takahashi et al. |
| 2015/0042963 A1 | 2/2015 | Nishimori et al. |
| 2015/0131062 A1 | 5/2015 | Nishimori et al. |
| 2015/0253653 A1 | 9/2015 | Fujita et al. |
| 2015/0316840 A1 | 11/2015 | Maeda et al. |
| 2016/0103387 A1 | 4/2016 | Nishimori et al. |
| 2016/0223892 A1 | 8/2016 | Takahashi et al. |
| 2016/0320692 A1 | 11/2016 | Takahashi et al. |
| 2016/0334695 A1 | 11/2016 | Yamada et al. |
| 2016/0349606 A1 | 12/2016 | Nishimori et al. |
| 2016/0377969 A1 | 12/2016 | Nishimori et al. |
| 2017/0299953 A1 | 10/2017 | Maeda et al. |
| 2018/0217481 A1 | 8/2018 | Hama et al. |
| 2018/0299757 A1 | 10/2018 | Liao |
| 2019/0025684 A1 | 1/2019 | Zhao et al. |
| 2019/0101813 A1 | 4/2019 | Miyazaki |
| 2019/0129288 A1 | 5/2019 | Maeda et al. |
| 2019/0331990 A1 | 10/2019 | Zhang et al. |
| 2020/0064719 A1 | 2/2020 | Nakamura et al. |
| 2020/0201158 A1 | 6/2020 | Maeda et al. |
| 2020/0301260 A1 | 9/2020 | Takano et al. |
| 2020/0301266 A1 | 9/2020 | Nakamura et al. |

FOREIGN PATENT DOCUMENTS

| | | |
|---|---|---|
| CN | 102854623 A | 1/2013 |
| CN | 104048214 A | 9/2014 |
| CN | 104298059 A | 1/2015 |
| CN | 106030403 A | 10/2016 |
| CN | 207473278 U | 6/2018 |
| CN | 108375867 A | 8/2018 |
| CN | 108761981 A | 11/2018 |
| CN | 109100910 A | 12/2018 |
| CN | 109597273 A | 4/2019 |
| JP | 2010-169729 A | 8/2010 |
| JP | 2011-013320 | 1/2011 |
| JP | 2012-123179 | 6/2012 |
| JP | 2014-102367 A | 6/2014 |
| JP | 2014-130260 A | 7/2014 |
| JP | 2017083907 A | 5/2017 |
| JP | 2017215496 A | 12/2017 |
| JP | 2019-066811 A | 4/2019 |
| JP | 2019-140117 A | 8/2019 |
| WO | 2015/151180 A1 | 10/2015 |

OTHER PUBLICATIONS

Extended European Search Report issued Mar. 23, 2021 in European Patent Application No. 20204671.0, 8 pages.
Chinese Office Action issued Oct. 9, 2021, in corresponding Chinese Patent Application No. 202011161147.0.
Office Action issued Apr. 8, 2022 in Chinese Patent Application No. 202011161147.0, 4 pages.
Office Action mailed Oct. 28, 2023, in Chinese Application No. 202210716647.9, 9 pages.

TOTAL ENERGY OF LIGHT INCLUDED IN ☐ : A

TOTAL ENERGY OF LIGHT INCLUDED IN ☐ : B

LIGHT-SOURCE DEVICE AND IMAGE FORMING APPARATUS INCLUDING SAME

CROSS-REFERENCE TO RELATED APPLICATION

This patent application is a continuation of U.S. application Ser. No. 17/085,193, filed Oct. 30, 2020, which is based on and claims priority pursuant to 35 U.S.C. § 119(a) to Japanese Patent Application No. 2019-200038, filed on Nov. 1, 2019, in the Japan Patent Office, the entire disclosures of each are hereby incorporated by reference herein.

BACKGROUND

Technical Field

Embodiments of the present disclosure relate to a light-source device and an image projection apparatus.

Related Art

Currently, projectors (or image projection apparatuses) that magnify and project various kinds of images or moving images are widely used. Projectors focus the light emitted by a light source onto a spatial-light modulation element such as a digital micromirror device (DMD) or a liquid crystal display, and display, as a color image, the light emitted from the spatial-light modulation element, which is modulated using a video signal, onto a screen.

In the related art, for example, high-brightness ultrahigh-pressure mercury lamps are used for the light source of projectors. However, the life of such a is short and frequent maintenance is frequently required. In recent years, projectors using. e.g., a laser source or a light emitting diode (LED) light source instead of an ultra-high pressure mercury lamp have been increasing. The laser source and the LED light source have a longer product life than the product life of the ultra-high pressure mercury lamp and have a good color reproducibility due to the monochromaticity.

A projector irradiates an image display element such as a DMD with light of, for example, three colors including red, green, and blue which are primary colors to form an image. All the three colors can be generated by laser sources; however, this is not desirable because a green laser and a red laser have lower emission efficiencies than a blue laser. Thus, there is used a method of irradiating a fluorescent material with a blue laser beam as excitation light to obtain fluorescence light (fluorescence) through wavelength conversion at the fluorescent material and generating red light and green light from the fluorescence light.

Since excitation light of several tens of watts (W) is condensed and emitted to the fluorescent material, the efficiency degradation or the changes over time might occur due to burnout or temperature rise. For this reason, a disc on which a phosphor (fluorescent material) layer is formed is rotated to prevent the irradiation position of the excitation light from being concentrated on one point. The disc is called a phosphor wheel. In the phosphor wheel, the fluorescent material is formed in a fan shape or a toroidal shape along the periphery of the disc.

SUMMARY

According to an aspect of the present disclosure, a light-source device includes an excitation light source, an optical member, and a wavelength converter. The excitation light source is configured to emit first color light. The optical member has a reflecting surface configured to reflect the first color light emitted from the excitation light source. The wavelength converter includes a wavelength conversion member on which the first color light reflected by the optical member is incident. The wavelength conversion member is configured to convert at least part of the first color light into second color light having a wavelength different from a wavelength of the first color light and emit the second color light. A center of the first color light on the reflecting surface of the optical member does not intersect with a light flux of the first color light emitted from the wavelength converter.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 1A and 1B are schematic diagrams of a light-source device according to an embodiment of the present disclosure, in which FIG. 1A is a schematic diagram of an optical arrangement of the light-source device; and FIG. 1B is a schematic diagram of an example of excitation light projected on a dichroic mirror of the light-source device of FIG. 1A;

FIGS. 5A, 5B, and 5C are schematic views of a light-source device according to still another embodiment of the present disclosure, in which FIG. 5A is a schematic diagram of an optical arrangement of the light-source device, FIG. 5B is a facing view of a rod integrator in the light-source device as viewed from an incident aperture plane side, and FIG. 5C is a facing view of the rod integrator as viewed from an exit aperture plane;

FIGS. 6A and 6B are schematic views of a light-source device according to still another embodiment of the present disclosure, in which FIG. 6A is a schematic diagram of an optical arrangement of an optical path of excitation light, and FIG. 6B is a schematic diagram of an optical arrangement of an optical path of fluorescence light in the embodiment;

FIGS. 10A and 10B are schematic diagrams of the light-source device according to the first embodiment, in which FIG. 10A is a schematic diagram of an optical arrangement of an optical path of blue laser light, and FIG. 10B is a schematic diagram of an optical arrangement of an optical path of fluorescence light;

FIGS. 13A and 13B are illustrations of the configuration of a phosphor unit included in the light-source device according to the first embodiment, in which FIG. 13A is a front view of the phosphor unit from an incident direction of blue light, and FIG. 13B is a side view of the phosphor unit from a direction orthogonal to the incident direction of blue light;

FIGS. 14A and 14B are illustrations of the configuration of a color wheel included in the light-source device according to the first embodiment, in which FIG. 14A is a front view of the color wheel from an incident direction of blue light and fluorescence light, and FIG. 14B is a side view of the color wheel from a direction orthogonal to the incident direction of blue light and fluorescence light;

FIGS. 16A and 16B are schematic diagrams of optical paths of a light-source device according to a second embodiment of the present disclosure, in which FIG. 16A is a schematic diagram of an optical arrangement of an optical path of blue light and FIG. 16B is a schematic diagram of an optical arrangement of an optical path of fluorescence light;

FIGS. 18A and 18B are schematic diagrams of a light-source device according to a third embodiment of the present disclosure, in which FIG. 18A is a schematic diagram of an optical arrangement of an optical path of blue laser light, and FIG. 18B is a schematic diagram of an optical arrangement of an optical path of fluorescence light;

FIGS. 19A and 19B are schematic diagrams of a light-source device according to a fourth embodiment of the present disclosure, in which FIG. 19A is a schematic diagram of an optical arrangement of an optical path of blue laser light, and FIG. 19B is a schematic diagram of an optical arrangement of an optical path of fluorescence light;

Figure 1A:
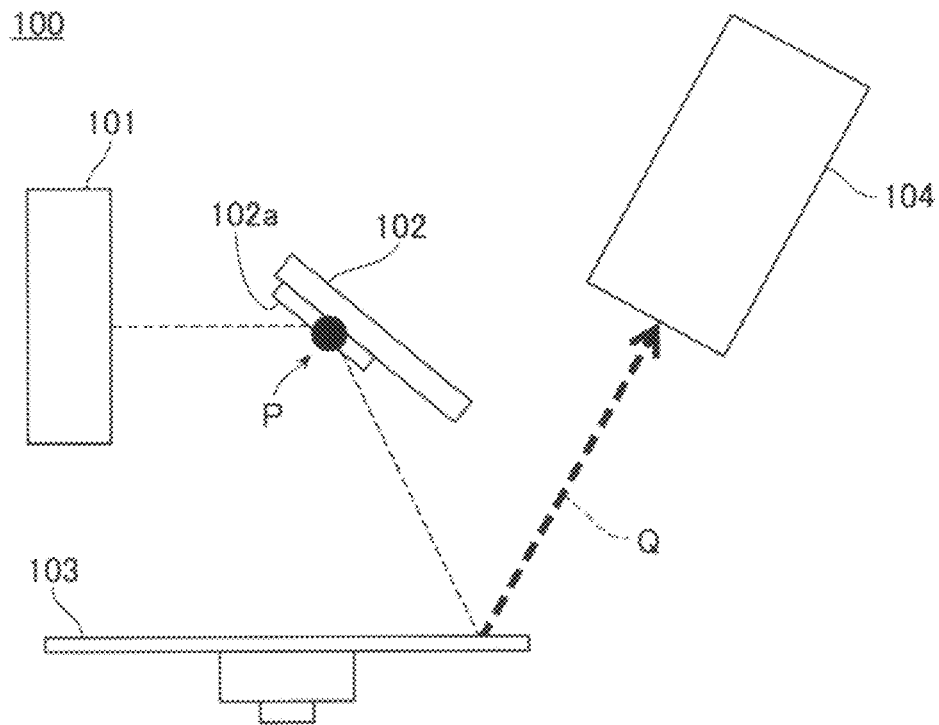

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Light-source devices are known provided with a DMD and a phosphor wheel whose part is used as a reflector so as to reduce the size of the entire light-source device. In such light-source devices, the excitation light is reflected by the phosphor wheel in the same direction as the fluorescence light, and a phase-contrast plate, such as a quarter (¼) wave retarder, and the polarization splitter are arranged on the optical path to prevent the reflected light from returning to a light source of the excitation light.

In the light-source device having such a configuration, the phase-contrast plate and the polarization splitter are disposed on the optical path of the excitation light, thus hampering downsizing of the light-source device and increasing the production cost. In addition, the optical path of the excitation light proceeding to the phosphor wheel and the optical path of the excitation light reflected from the phosphor wheel pass through the same position in phase-contrast plate or the polarization splitter. Accordingly, the light condensing density on the optical elements increases, which might cause damage or a decrease in reliability of the light-source device.

The present inventors have paid attention to the fact that such a configuration of the light-source device hampers the downsizing of the device body and the reduction in cost, and also causes a decrease in reliability. Then, the present inventors have found that a configuration in which the optical path of the excitation light proceeding to the phosphor wheel and the optical path of the excitation light reflected from the phosphor wheel do not overlap with each other contribute to the downsizing of the device body, the cost reduction, and an increase in reliability, Thus, present inventors have conceived of the embodiments of the present disclosure.

At least one embodiment of the present disclosure provides a light-source device including a light source that emits excitation light, an optical element having a reflecting surface that reflects the excitation light emitted from the light source, and a wavelength converter including a wavelength conversion member configured to convert at least some of the excitation light into a fluorescence light having a wavelength different from a wavelength of the excitation light and emit the converted fluorescence light. In such a light-source device, a point P is prevented from intersecting with a light flux Q where the point P is the center of a projection image of the excitation light projected onto the reflecting surface of the optical element, and the light flux Q is a light flux of excitation light emitted from the wavelength converter.

According to at least one embodiment of the present disclosure, the light flux of the excitation light emitted from the wavelength converter does not intersect with the center of the projection image of the excitation light emitted from the light source. Such a configuration can prevent these pieces of excitation light from passing through the same location on the optical element, which further prevents damage of the optical element due to an increase in the light condensing density. Thus, the reliability can be increased. Further, in the present embodiment, particular optical elements such as a phase-contrast plate and a polarization splitter are not used to separate the optical paths of the excitation light from the waveform conversion unit. This reduces the number of components and the cost for producing the device, thus achieving a reduction in the size of the device.

Figure 1B:
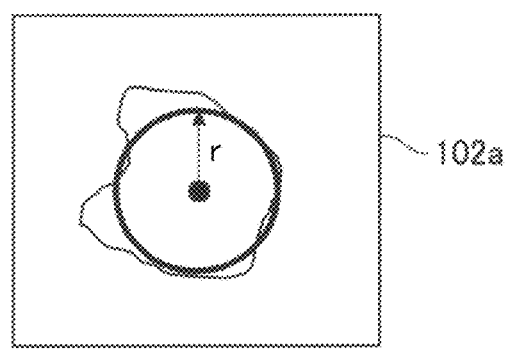

FIGS. 1A and 1B are illustrations of a light-source device 100 according to an embodiment of the present disclosure. FIG. 1A is an illustration of components of the light-source device 100 according to the present embodiment. FIG. 1B is an illustration of excitation light projected onto a reflecting surface 102a of a dichroic mirror 102 of the light-source device 100. FIG. 1B depicts the reflecting surface 102a as viewed from a direction of travel of excitation light from a light source 101.

As illustrated in FIG. 1A, the light-source device 100 includes the light source 101, which is an excitation light source, and the dichroic mirror 102, which is an example of an optical member. The light-source device 100 also includes a phosphor unit 103, which is an example of a wavelength converter, and a rod integrator 104, which is an example of a light mixing element.

The light-source device 100 according to an embodiment of the present disclosure is not limited to the configuration illustrated in FIG. 1, and can be appropriately changed. In some embodiments, for example, the light-source device 100 may include only the light source 101, the dichroic mirror 102, and the phosphor unit 103. In the light-source device 100 including the light source 101, the dichroic mirror 102, and the phosphor unit 103, the components other than the light source 101 constitute a light-source optical system.

The light source 101 emits excitation light (also referred to as "first color light" in the following description). The dichroic mirror 102 has the reflecting surface 102a that reflects the excitation light emitted from the light source 101 and guides the excitation light to the phosphor unit 103. The portion of the dichroic mirror 102 other than the reflecting surface 102a may have an optical property that transmits the excitation light emitted from the light source 101 and the fluorescence light emitted from the phosphor unit 103.

The phosphor unit 103 has a first area that reflects or diffuse-reflects the excitation light and a second area that converts at least a part of the excitation light into fluorescence light having a wavelength different from the wavelength of the excitation light and emits the fluorescence light. The fluorescence light may be referred to as "second colored light". Once the excitation light is incident on the phosphor unit 103, the phosphor unit 103 alternately emits the excitation light and the fluorescence light to the incident-plane side (upward in FIG. 1A) on which the excitation light has been incident, in a sequential manner. The rod integrator 104 is disposed such that the excitation light and the fluorescence light emitted from the phosphor unit 103 are directed to and incident on the rod integrator 104. The rod integrator 104 mixes and homogenizes the incident excitation light and fluorescence light to emit the mixed light to the outside of the light-source device 100.

FIG. 1A depicts a case in which the first area of the phosphor unit 103 is present on the optical path of the excitation light emitted from the light source 101. The excitation light emitted from the light source 101 is reflected by the reflecting surface 102a of the dichroic mirror 102 toward the phosphor unit 103. The excitation light reflected by the reflecting surface 102a is reflected by the first area of the phosphor unit 103 toward the incident-plane side on which the reflected excitation light has been incident on the phosphor unit 103. The rod integrator 104 is disposed on the way in which the excitation light is reflected by the phosphor unit 103.

In the light-source device 100 in which the optical path of the excitation light is formed as described above, the center of the excitation light on the reflecting surface 102a of the dichroic mirror 102 is defined as a point P. The light flux of the excitation light emitted from the phosphor unit 103 is referred to as a light flux Q. In the light-source device 100, the dichroic mirror 102, the phosphor unit 103, and the rod integrator 104 are arranged so that the point P and the light flux Q do not intersect with each other.

The point P of the excitation light on the reflecting surface 102a, that is, the center of the projection image of the excitation light to be projected is defined as follows. (1) A case in which the light intensity distribution within the projection range of the excitation light projected onto the reflecting surface 102a is line-symmetric or point-symmetric. The center of the minimum circumscribed circle (circumcircle) of the projection range of the excitation light is set as the center of the projection image center. (2) A case in which the light intensity distribution of the projection range of the excitation light projected on the reflecting surface 102a is other than line symmetric or point symmetric, that is, a case other than the above case (1). As illustrated in FIG. 1B, A denotes the total energy of the excitation light projected onto the reflecting surface 102a and B denotes the total energy of light included in any desired circle with a radius r within the projection range. The ratio of B with respect to A (B/A) is greater than or equal to 93% (B/A≥93%) and the center of the circle with a radius r, at which the energy density is maximum within the circle, is set as the center of the projection image.

Note that the projection range of the excitation light is a range having an energy of $1/e^2$ or more of the maximum energy within the energy distribution of the excitation light projected onto the reflecting surface 102a. The energy density is obtained by dividing the "energy contained in the circle" by the "area of the circle", that is, energy density=energy contained in the circle/area of the circle. Note that the point P, i.e., the center of the projection image of the excitation light as defined above is determined with all the light source 101 within the light-source device 100 turned on.

Further, the light flux Q of the excitation light emitted from the phosphor unit 103 is a light flux of light rays passing through the range having the energy of $1/e^2$ or more of the maximum energy within the energy distribution of the excitation light on a plane perpendicular to the propagation direction of the excitation light.

In the light-source device 100 according to the present embodiment, the light flux Q of the excitation light emitted from the phosphor unit 103 does not intersect the center of the projection image of the excitation light, which is the center of the excitation light emitted from the light source 101 on the reflecting surface 102a. Such a configuration can prevent the excitation light from being transmitted through the same portion on the dichroic mirror 102 and restrain damage to the dichroic mirror 102 due to an increase in light condensing density. Such a configuration can also obviate the necessity of particular optical elements such as a phase-contrast plate and a polarization splitter to separate the optical path of the excitation light emitted from the phosphor unit 103, from the other optical path. Accordingly, the number of components and the cost for producing the device can be reduced, thus achieving a reduction in the size of the device.

In the light-source device 100 illustrated in FIGS. 1A and 1B, the phosphor unit 103 alternately switches and emits the excitation light and the fluorescence light in a sequential manner, that is, emits the excitation light and the fluorescence light in a time division manner. However, the phosphor unit 103 is not limited to such a configuration, and may have a configuration of simultaneously emitting excitation light and fluorescence light.

For example, instead of the first area and the second area, the phosphor unit 103 has an area, i.e., a third area that reflects a portion of the excitation light and converts the other portion of the excitation light into fluorescence light having a waveform different from a waveform of the excitation light. A wavelength conversion member provided in the third area reflects the excitation light and convert a portion of the excitation light into the fluorescence light. The phosphor unit 103 may be referred to as a stationary phosphor unit. Once the excitation light is incident on the phosphor unit 103, the phosphor unit 103 emits the excitation light and the fluorescence light together to the incident-plane side (upward in FIG. 1A) on which the excitation light has been incident on the phosphor unit 103. In the configuration including the phosphor unit 103 described above, the same advantageous effect can be obtained as in the case in which the phosphor unit 103 operates in a time-division manner.

In some examples, the light-source device 100 in FIG. 1 may include a light guide configured to guide at least one of the excitation light and the fluorescence light emitted from the phosphor unit 103 to the rod integrator 104. For example, the light guide includes a condenser lens and a refractive lens and is arranged in an optical path between the phosphor unit 103 and the rod integrator 104. The light guide included in the light-source device 100 can efficiently guide at least one of the excitation light and the second colored light emitted from the phosphor unit 103 to the rod integrator 104 and can enhance the utilization efficiency of light.

Figure 2:
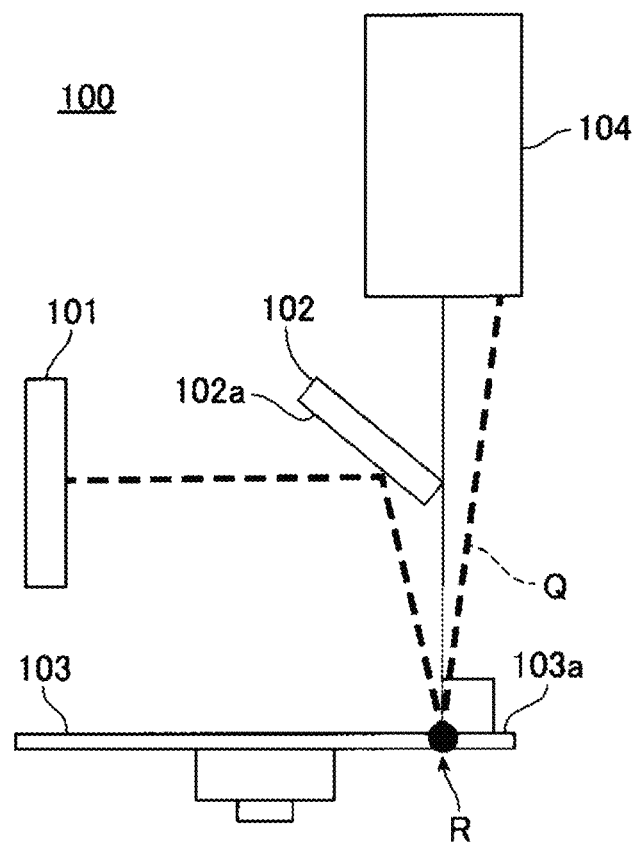
FIG. 2 is a schematic diagram of an optical arrangement of a light-source device according to another embodiment of the present disclosure.

In the light-source device 100 according to the present embodiment, the position of the rod integrator 104 can be appropriately changed in order to enhance the utilization efficiency of at least one of the incident excitation light and fluorescence light. FIG. 2 depicts a light-source device according to another embodiment of the present disclosure. In FIG. 2, the same components as the components of the embodiment illustrated in FIGS. 1A and 1B are denoted by the same reference numerals, and the description thereof is simplified. FIG. 2 depicts a case in which a reflecting surface 102a is formed on a surface of a dichroic mirror 102. The same applies to the drawings to be described below.

In the embodiment illustrated in FIG. 2, the center of a projection image of excitation light emitted from the dichroic mirror 102 and projected onto a phosphor unit 103 is designated as a point R. In this case, it is preferably that the rod integrator 104 is disposed on the normal to the point R on an exit plane 103a of the phosphor unit 103. With such an arrangement of the rod integrator 104, when the fluorescence light is emitted perpendicularly to the exit plane 103a of the phosphor unit 103, the fluorescence light can effectively be incident on the rod integrator 104. Thus, the utilization efficiency of the fluorescence light can be enhanced.

In the light-source device 100 according to the present embodiment, a light condensing element may be disposed on the optical path between the dichroic mirror 102 and the phosphor unit 103. The light condensing element condenses the excitation light reflected by the dichroic mirror 102 and substantially parallelizes the fluorescence light emitted from the phosphor unit 103. For example, the focusing element is a condenser lens.

Figure 3:
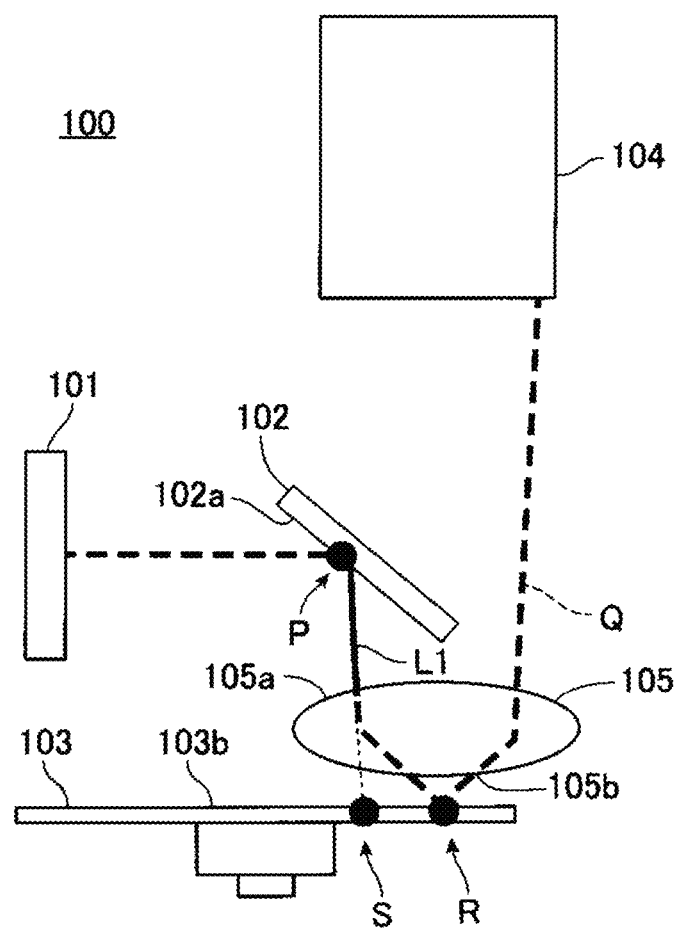
FIG. 3 is a schematic diagram of an optical arrangement of a light-source device according to still another embodiment of the present disclosure.

FIG. 3 depicts a light-source device according to still another embodiment of the present disclosure. In FIG. 3, the same reference numerals are given to the same components as the components of the embodiment illustrated in FIG. 1, and the description thereof is omitted. In the light-source device 100 illustrated in FIG. 3, a condenser lens 105 as the light condensing element is disposed in the optical path between the dichroic mirror 102 and the phosphor unit 103. The condenser lens 105 condenses the excitation light reflected by the dichroic mirror 102 and substantially parallelizes the fluorescence light emitted from the phosphor unit 103.

FIG. 3 indicates a straight line L1 connecting the above-described point P on the reflecting surface 102a and the center of the projection image on an incident plane 105a of the condenser lens 105. The projection image is projected on the incident plane 105a by the excitation light that has been reflected by the reflecting surface 102a of the dichroic mirror 102 and incident on the condenser lens 105. Further, FIG. 3 also indicates a point S that is a point of intersection of the straight line L1 and an incident plane 103b of the phosphor unit 103 on which the excitation light that has been condensed by the condenser lens 105 is incident. In the light-source device 100, the point S and the point R, which is the center of the projection image of the excitation light projected onto the phosphor unit 103, are disposed at different positions. With such an arrangement of the condenser lens 105, the excitation light and the fluorescence light, which are to be emitted from the phosphor unit 103 while diverging, can be collimated. Accordingly, the collimated excitation light and fluorescence light can be incident on the rod integrator 104 effectively, thus enhancing the utilization efficiency of light.

In the light-source device 100 illustrated in FIG. 3, the straight line L1 preferably intersects perpendicularly with the incident plane 103b of the phosphor unit 103. With such a configuration that the straight line L1 intersects perpendicularly with the incident plane 103b of the phosphor unit 103, the distance between the dichroic mirror 102 and the phosphor unit 103 can be reduced, and the size of the entire light-source device 100 can be reduced.

In the case where light passes through an optical element having a certain thickness, the incident plane is a surface on which the light is incident, and the exit plane is a surface from which the light is emitted. For example, in the condenser lens 105 illustrated in FIG. 3, a surface on which the reflection light from the reflecting surface 102a of the dichroic mirror 102 is incident is an incident plane 105a, and a surface on which the reflection light passes through the inside of the condenser lens 105 from the incident plane 105a and is emitted to the phosphor unit 103 side is an emission surface 105b.

Figure 4:
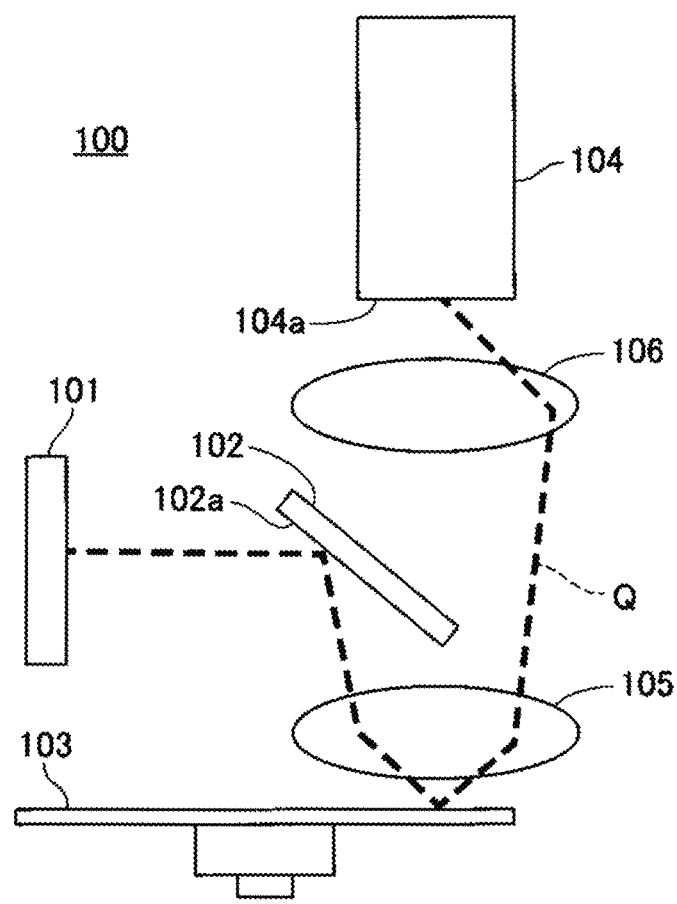
FIG. 4 is a schematic diagram of an optical arrangement of a light-source device according to still another embodiment of the present disclosure.

In the light-source device 100 according to the present embodiment, a refractive optical element may be disposed between the condenser lens 105 and the rod integrator 104. The refractive optical element condenses at least one of the excitation light and the fluorescence light collimated by the condenser lens 105, which is a light condensing element, and guides the condensed light to the rod integrator 104. The refractive optical element is, for example, a refractive lens. FIG. 4 depicts a light-source device 100 according to an embodiment of the present disclosure having such a configuration. In FIG. 4, the same reference numerals are given to the same components as the components of the embodiment illustrated in FIG. 3, and redundant description thereof is omitted.

In the light-source device 100 illustrated in FIG. 4, a refractive lens 106 as the refractive optical element is disposed in an optical path between a condenser lens 105 and a rod integrator 104. The refractive lens 106 refracts and condenses at least one of the excitation light and the fluorescence light collimated by the condenser lens 105, which is a light condensing element, and guide the condensed light to an incident aperture 104a of the rod integrator 104. With such an arrangement of the refractive lens 106, at least one of the excitation light and fluorescence light collimated by the condenser lens 105 can be effectively incident on the rod integrator 104, thus enhancing the utilization efficiency of light.

In the light-source device 100 illustrated in FIG. 4, it is preferable to select the arrangement position of the rod integrator 104 from the viewpoints of homogenization and uniformization of at least one of the excitation light and the fluorescence light incident on the rod integrator 104. For example, when the inner peripheral cross section of the rod integrator 104 is rectangular, the long side of an elliptical cross section of the excitation light incident on the rod integrator 104 may be arranged to correspond to the long side of the inner peripheral cross section of the rod integrator 104.

Further, in the light-source device 100 in FIG. 4, it is desired that the light source 101 be disposed to substantially prevent vignetting of the excitation light on the reflecting surface 102a of the dichroic mirror 102. For example, when the light-emitting surface of the light source 101 is rectangular, preferably, the light source 101 is disposed such that the width of the excitation light is narrower.

Figure 5A:
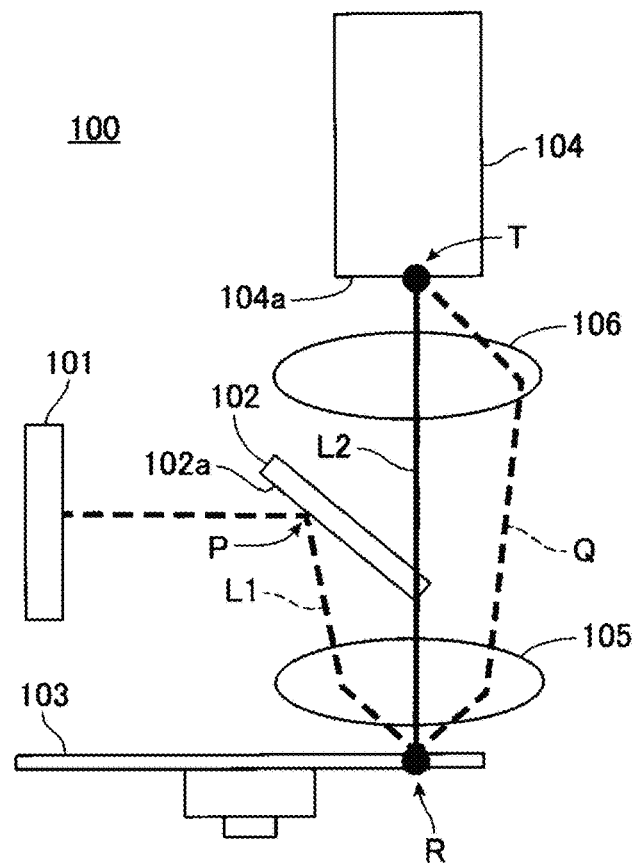
Figure 5B:
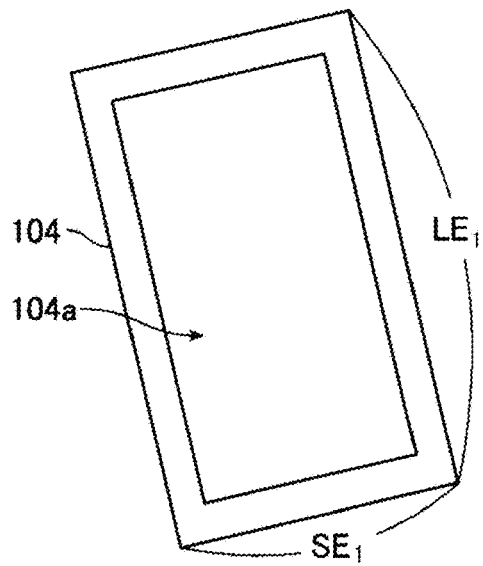
Figure 5C:
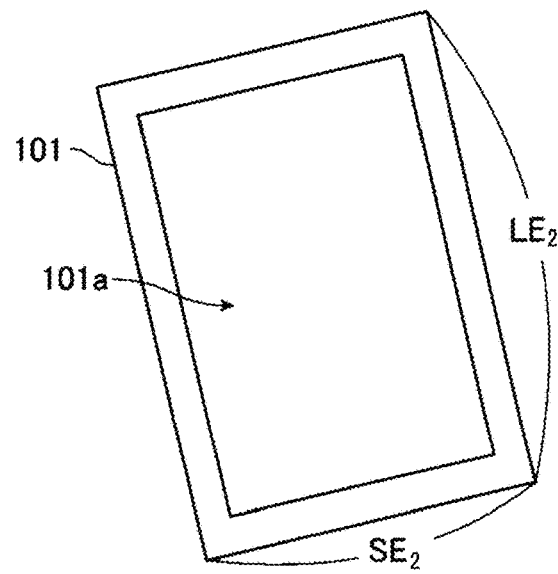

FIGS. 5A, 5B, and 5C depict a light-source device according to still another embodiment of the present disclosure. In FIGS. 5A, 5B, and 5C, the same reference numerals are given to the same components as the components of the embodiment illustrated in FIG. 4, and redundant description thereof is omitted. FIG. 5A depicts a light-source device 100 according to the present embodiment. FIG. 5B is an illustration of an incident aperture 104a of a rod integrator 104 included in the light-source device 100. FIG. 5C is an illustration of a light source 101 included in the light-source device 100. FIG. 5B is a view of the incident aperture 104a of the rod integrator 104 viewed from a phosphor unit 103 side. FIG. 5C is a view of a light-emitting surface of the light source 101 viewed from a dichroic mirror 102 side.

In the light-source device 100 illustrated in FIG. 5A, a point T is the center of a projection image projected on the incident aperture 104a of the rod integrator 104. The projection image is formed on the incident aperture 104a by at least one of the excitation light and the fluorescence light refracted and condensed by the refractive lens 106. A straight line L2 is a straight line connecting the point T and a point R that is the center of a projection image of the excitation light projected on the phosphor unit 103. As illustrated in FIG. 5B, the incident aperture 104a of the rod integrator 104 has a rectangular shape having a longer side $LE_1$ and a shorter side $SE_1$. Further, as illustrated in FIG. 5C, the light-emitting surface 101a of the light source 101 has a rectangular shape having a longer side $LE_2$ a shorter side $SE_2$.

In the light-source device 100, preferably, a plane including the straight line L1 and the straight line L2, that is, a plane including the drawing sheet in which FIG. 5A is drawn is substantially parallel to the shorter side $SE_1$ of the incident aperture 104a of the rod integrator 104. In other words, the rod integrator 104 is arranged such that the shorter side $SE_1$ of the rod integrator 104 in FIG. 5B is parallel to the drawing sheet of FIG. 5A. With such an arrangement of the rod integrator 104, the excitation light can strike on the inner surface corresponding to the longer side $LE_1$ of the incident aperture 104a of the rod integrator 104 so as to be incident on the rod integrator 104. Accordingly, the number of reflection of the excitation light or the like within the rod integrator 104 is increased, and the excitation light or the like is homogenized, thus preventing unevenness in the color of the excitation light or the like.

In the light-source device 100, preferably, the plane including the straight line L1 and straight line L2, that is, the plane including the drawing sheet in which FIG. 5A is drawn is substantially parallel to the shorter side $SE_2$ of the light-emitting surface 101a of the light source 101. In other words, the light source 101 is arranged such that the shorter side $SE_2$ of the light-emitting surface 101a in FIG. 5C is parallel to the drawing sheet of FIG. 5A. With such an arrangement of the light source 101, the width of the light flux extending in a direction in which the plane including the straight lines L1 and L2 extends can be reduced. Such a configuration can prevent vignetting on the reflecting surface 102a of the dichroic mirror 102 and a reduction in the utilization efficiency of light. Such a configuration also can prevent the light reflected by the phosphor unit 103 from interfering with the dichroic mirror 102 and restrain a reduction in the utilization efficiency of light.

In the light-source device 100 according to an embodiment of the present disclosure, it is desired that the rod integrator 104 be disposed according to the relative positions of the refractive lens 106 and the rod integrator 104. For example, it is preferable that the center of an image projected onto the incident aperture 104a of the rod integrator 104, the center of an image of fluorescence light projected onto the incident aperture 104a of the rod integrator 104, and the optical axes of the refractive lens 106 intersect at one point.

Figure 6B:
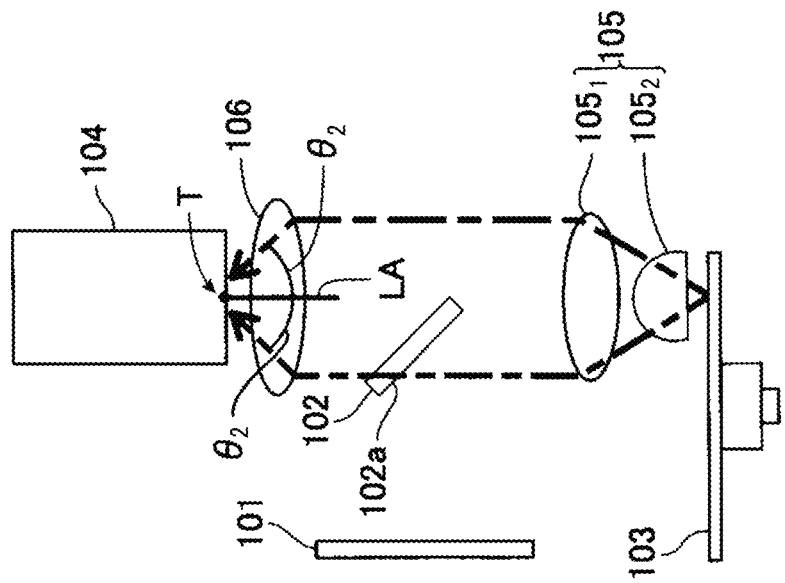
Figure 6A:
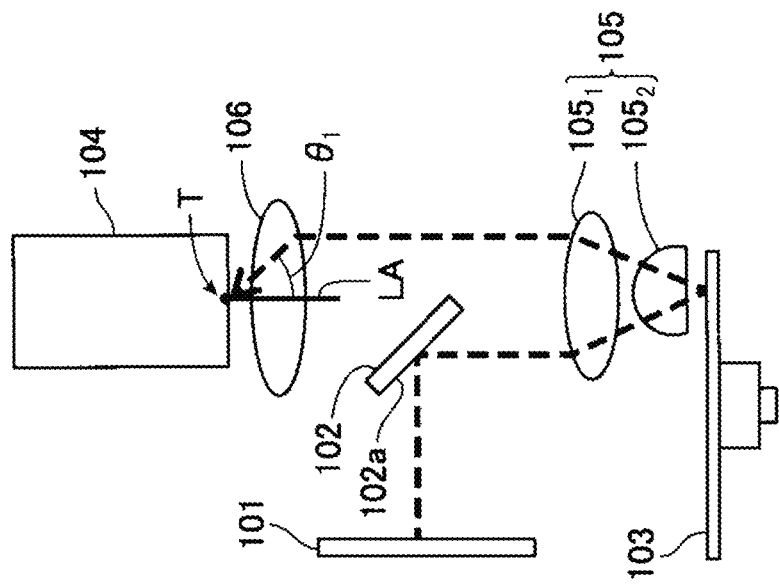

FIGS. 6A and 6B depict an outline of a light-source device 100 according to still another embodiment of the present disclosure. In FIGS. 6A and 6B, the same reference numerals are given to the same components as the components of the embodiment illustrated in FIGS. 5A, 5B, and 5C, and redundant description thereof is omitted. FIG. 6A depicts the optical path of excitation light in the light-source device 100. FIG. 6B depicts the optical path of fluorescence light in the light-source device 100. FIGS. 6A and 6B also depict a pair of condenser lenses 1051 and 1052 arranged along a propagation direction of light, for convenience of illustration.

In the light-source device 100 illustrated in FIGS. 6A and 6B, the center of a projection image projected on an incident aperture 104a of a rod integrator 104 by at least one of the excitation light and the fluorescence light condensed by a refractive lens 106 is the above-described point T. Further, the refractive lens 106 is arranged so that the optical axis LA of the refractive lens 106 passes through the point T. Accordingly, the center of the projection image of the excitation light and the fluorescence light projected on the incident aperture 104a of the rod integrator 104 intersect at one point with the optical axis LA of the refractive lens 106. Such an arrangement allows the excitation light and the fluorescence light to be incident on the center of the incident aperture 104a of the rod integrator 104, and thus restrain the occurrence of the vignetting on the incident aperture 104a of the rod integrator 104. As a result, the utilization efficiency of light can be enhanced. In addition, a reduction in the utilization efficiency of light, caused by misalignment of the optical elements within the light-source device 100 due to component tolerances, can also be restrained.

The arrangement of the refractive lens 106 in the light-source device 100 according to the present embodiment is preferably selected from the viewpoint of setting the angles of the excitation light and the fluorescence light incident on the incident aperture 104a of the rod integrator 104 within a certain range. Note that the angle of the light ray with respect to the incident aperture 104a refers to an angle between the light ray and the normal line of a plane parallel to the incident aperture 104a. For example, in the light-source device 100, the maximum incident angle of a light ray of the excitation light with respect to the incident aperture 104a is smaller than the maximum incident angle of a light ray of the fluorescence light with respect to the incident aperture 104a.

As illustrated in FIG. 6A, an angle $\theta_1$ is the maximum incident angle of the light ray of the excitation light with respect to the incident aperture 104a. As illustrated in FIG. 6B, an angle $\theta_2$ is the maximum incident angle of the light ray of the fluorescence light with respect to the incident aperture 104a. In the light-source device 100, it is desired that the angle $\theta_1$ be set smaller than the angle $\theta_2$. Setting the incident angle $\theta_1$ of the excitation light smaller than the incident angle $\theta_2$ of the fluorescence light can restrain the occurrence of vignetting in an optical system arranged downstream of the light-source device 100 and thus enhance the utilization efficiency of light.

In the light-source device 100 according to an embodiment of the present disclosure, the incident angle $\theta_1$ of the excitation light and the incident angle $\theta_2$ of the fluorescence light may be set equal to each other. Setting the incident angle $\theta_1$ of the excitation light equal to the incident angle $\theta_2$ of the fluorescence light allows the distribution of the excitation light projected on the DMD or the screen to be substantially the same as the distribution of the fluorescence light projected on the DMD or the screen. Accordingly, the unevenness in the color of the excitation light or the like can be restrained.

Figure 7:
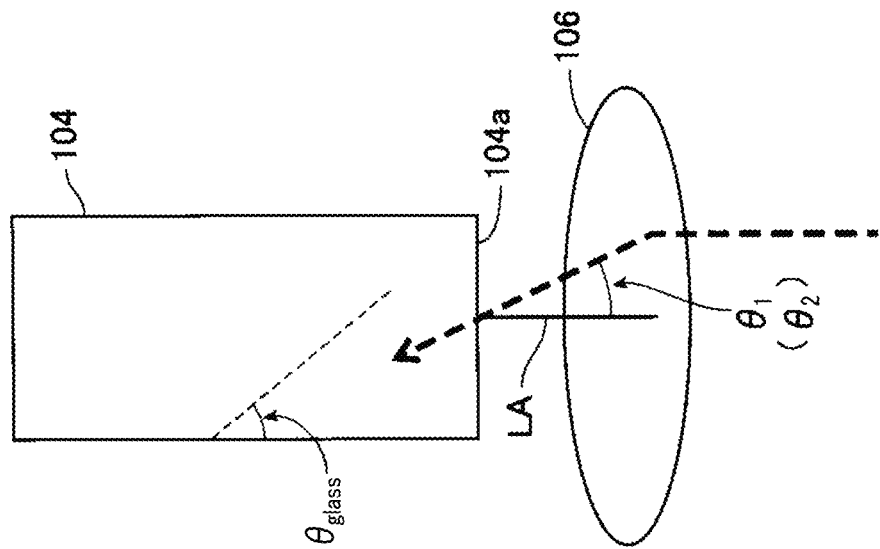
FIG. 7 is a schematic view of optical characteristics of a rod integrator according to an embodiment of the present disclosure.

In the light-source device 100 according to the present embodiment, the optical properties of the rod integrator 104 is preferably selected according to the relation of the incident angle $\theta_1$ of the excitation light and the incident angle $\theta_2$ of the fluorescence light. For example, it is preferable that the rod integrator 104 of the light-source device 100 is formed of a glass rod integrator, and the total reflection condition is set to be larger than the incident angle $\theta_1$ of the excitation light and the incident angle $\theta_2$ of the second color light. The optical characteristics of the rod integrator 104 included in the light-source device 100 according to the present embodiment are described with reference to FIG. 7. In FIG. 7, the rod integrator 104 is a glass rod integrator. The total reflection condition in the rod integrator 104 is assumed to be an angle $\theta_{glass}$. In this case, the angle $\theta_{glass}$ is set to be larger than the incident angle $\theta_1$ of the excitation light and the incident angle $\theta_2$ of the fluorescence light. Such a configuration can prevent the loss of the excitation light and the like inside the rod integrator 104, thus enhancing the utilization efficiency of light.

Figure 8:
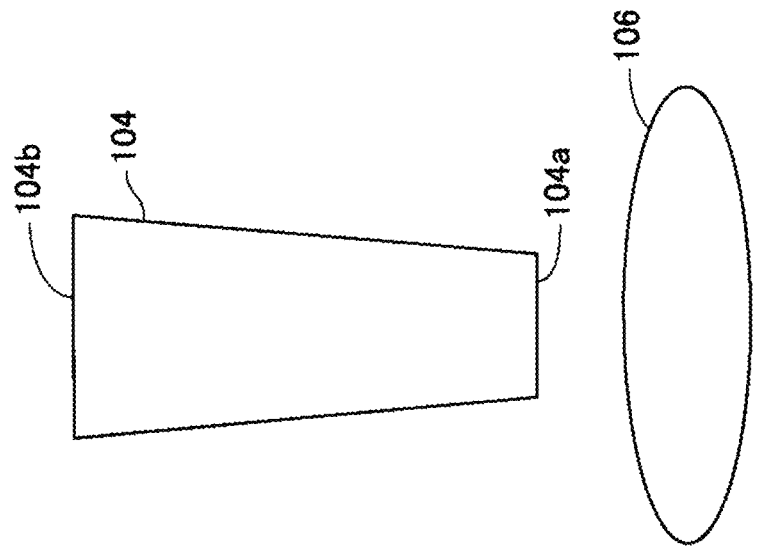
FIG. 8 is a schematic view of a rod integrator according to another embodiment of the present disclosure.

In the light-source device 100 according to the present embodiment, the rod integrator 104 constituting a light mixing element preferably has a tapered shape in which the incident aperture 104a is smaller than the exit aperture 104b, as illustrated in FIG. 8. When the rod integrator 104 has a tapered shape as described above, the emission angle of light from the rod integrator 104 is set to be small. Such a configuration can restrain vignetting of light in the optical system in the subsequent stage of the light-source device 100, thus enhancing the utilization efficiency of light.

Next, a description is given of a light-source optical system, a light-source device, and an image projection apparatus according to some embodiments of the present disclosure. A light-source optical system, a light-source device, and an image projection apparatus according to some embodiments of the present disclosure are examples of embodiments of the present disclosure, and can be appropriately changed. Further, the respective embodiments may be combined where appropriate.

First Embodiment

Figure 9:
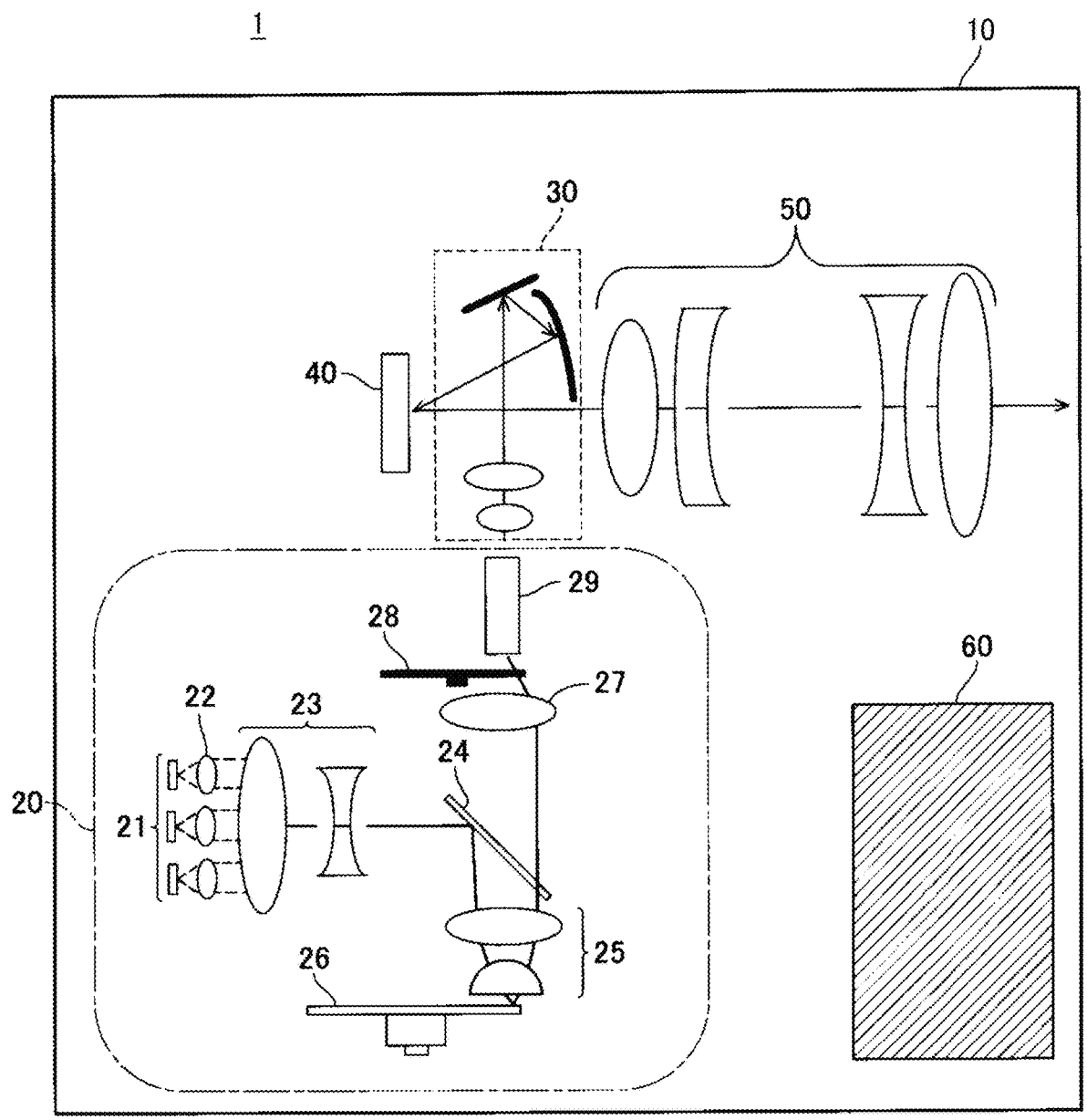
FIG. 9 is a schematic diagram of an optical arrangement of a light-source device according to a first embodiment of the present disclosure and a projector including the light-source device, according to an embodiment of the present disclosure.

FIG. 9 is a schematic diagram of the configuration of a projector 1, which is also referred to as image projection apparatus, including a light-source device 20 according to a first embodiment of the present disclosure. As illustrated in FIG. 9, the projector 1 includes a housing 10, a light-source device 20, an illumination optical system 30, an image forming element (or image display element) 40, a projection optical system 50, and a cooling device 60.

The housing 10 houses the light-source device 20, the illumination optical system 30, the image forming element 40, the projection optical system 50, and the cooling device 60. The light-source device 20 emits, for example, light beams having wavelengths corresponding to colors of RGB. An inner configuration of the light-source device 20 is described later in detail.

The illumination optical system 30 illuminates the image forming element 40 substantially uniformly with the light uniformized by a light tunnel 29, which is described later, included in the light-source device 20. The illumination optical system 30 includes, for example, one or more lenses and one or more reflecting surfaces.

The image forming element 40 forms an image by modulating the light illuminated by the illumination optical system 30, that is, the light from the light-source optical system of the light-source device 20. The image forming element 40 includes, for example, a digital micromirror device (DMD) or a liquid crystal display element. The image forming element drives the minute mirror surface in synchronization with blue light, green light, red light, and yellow light emitted from the illumination optical system 30, and generates a color image.

The projection optical system 50 magnifies and projects the color image formed by the image forming element 40 onto a screen, that is, a projection surface. The projection optical system 50 includes, for example, at least one lens. The cooling device 60 cools each of the elements and devices that take heat in the projector 1.

Figure 10B:
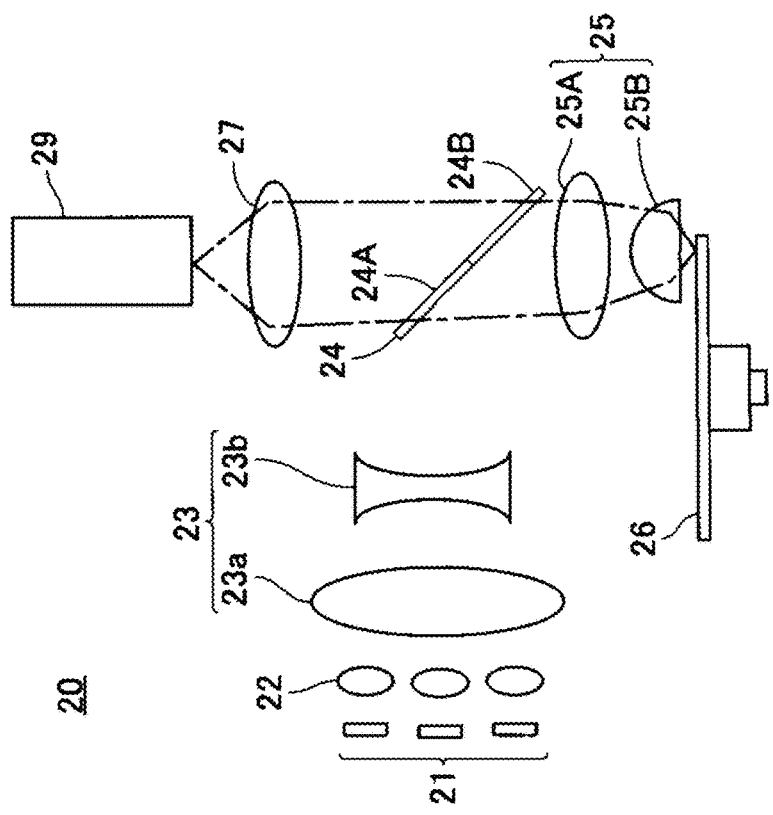
Figure 10A:
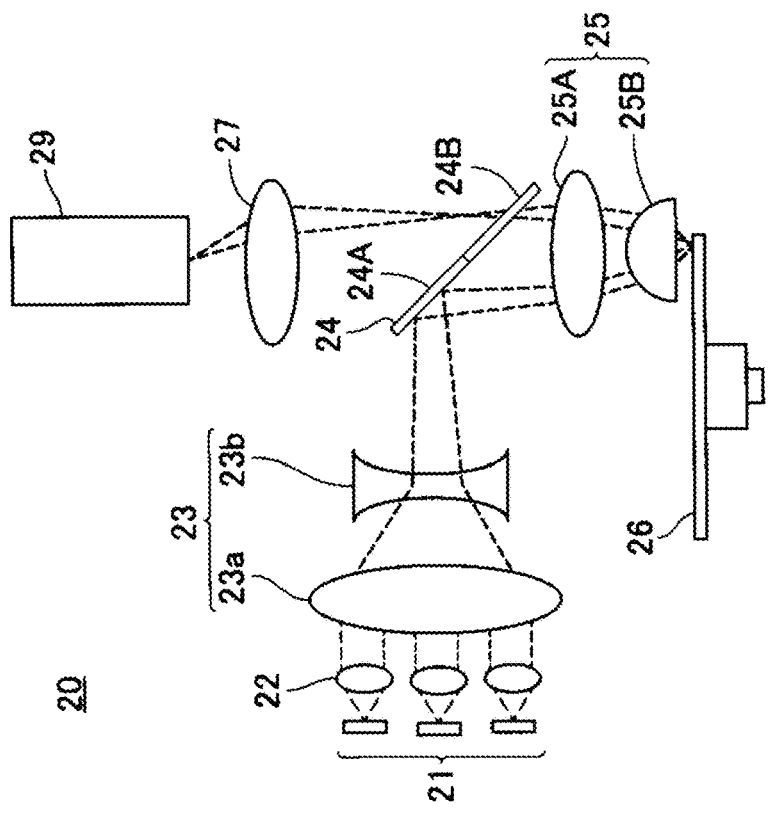

FIGS. 10A and 10B depict the light-source device 20 according to the first embodiment. FIG. 10A depicts the optical path of a blue laser beam in the light-source device 20. FIG. 10B depicts the optical path of fluorescence light in the light-source device 20.

As illustrated in FIG. 10A, the light-source device 20 includes a laser source (excitation light source) 21, a coupling lens 22, a first optical system 23, and a dichroic mirror 24 that is an example of an optical element, which are sequentially arranged in the propagation direction of light. The light-source device 20 further includes a second optical system 25, a phosphor unit 26 as an example of the wavelength converter, a refractive optical system 27, a color wheel 28, and a light tunnel 29 as an example of the light mixing element.

In FIGS. 10A and 10B, the color wheel 28 is omitted for convenience of illustration. As illustrated in FIG. 9, the color wheel 28 is disposed between the refractive optical system 27 and the light tunnel 29. As illustrated in FIG. 9, in the present embodiment, the color wheel 28 is described as a component of the light-source device 20. However, the configuration of the light-source device 20 is not limited to the above-described configuration, and the color wheel 28 may not be included in the light-source device 20.

As illustrated in FIGS. 10A and 10B, in the laser source 21, for example, a plurality of light sources are arranged in array to emit a plurality of laser beams. The laser source 21 emits, for example, light (i.e., blue laser beam) in a blue band where the center wavelength of emission intensity is 455 nm. Hereinafter, the blue laser beam is referred to simply as blue light. The blue light emitted from the laser source 21 is linearly polarized light whose polarization direction is a specific direction, and is also used as excitation light that is excited by fluorescent material or phosphor of the phosphor unit 26, which is to be described later.

The light emitted by the laser source 21 is not limited to light in the blue wavelength band and may be light with wavelengths that can excite the fluorescent material. Further, the laser source 21 has a plurality of light sources in the first embodiment, but is not limited thereto. In some examples, the laser source 21 may be configured by one light source. In addition, the laser source 21 may be configured as a plurality of light sources arranged in array on a substrate, but is not limited thereto, and may have another arrangement configuration.

The coupling lens 22 is a lens that receives blue light emitted from the laser source 21 and converts the blue light into parallel light, that is, collimated light. In the following description, the term "parallel light" is not limited to light that is completely collimated, but includes substantially collimated light. The number of coupling lenses 22 may be correspond to the number of light sources of the laser source 21 and increased or decreased in accordance with an increase or a decrease in the number of light sources of the laser source 21.

In the light-source device 20 according to the present embodiment, the laser source 21 and the coupling lens 22 constitute a light source unit. For example, the laser source 21 is configured by a plurality of laser diodes arranged in rows and columns. The light source unit includes the laser diodes and the coupling lenses 22 arranged on the light-emission surface side of the laser diodes.

Figure 11:
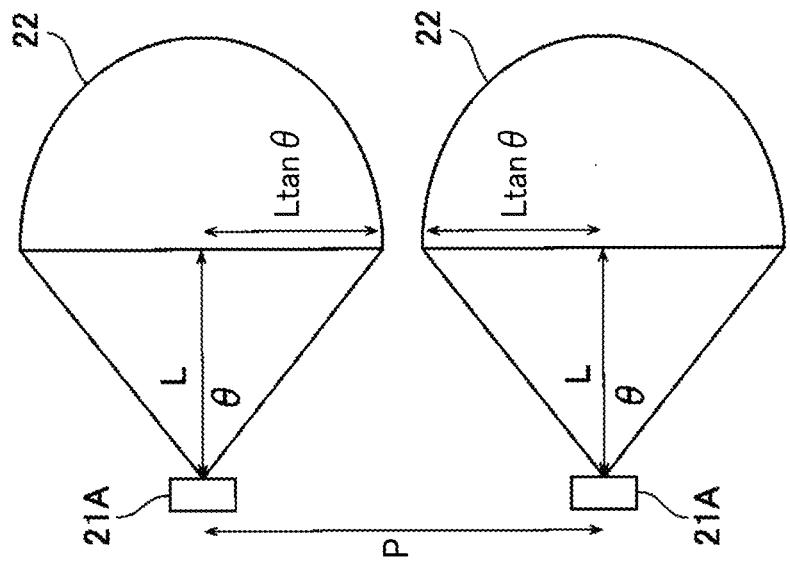
FIG. 11 is an illustration of a main part of a light source unit included in the light-source device according to the first embodiment.

FIG. 11 depicts a main part of the light source unit included in the light-source device according to the first embodiment. In the light source unit illustrated in FIG. 11, each coupling lens 22 is arranged to face a laser diode 21A. In the light source unit, when θ denotes a divergence angle of the blue light emitted from each laser diode 21A, the divergence angle being larger one between the row direction the column direction, P denotes a pitch between adjacent laser diodes 21A, and L denotes a distance from a light-emitting point of a laser diode 21A to a corresponding coupling lens 22, the interval (P/L tan θ) between the laser diodes 21A is configured to satisfy Formula (1) below:

$$1 \leq P/L \tan \theta \leq 4 \tag{1}$$

Most preferably, the interval between the laser diodes 21A is configured to satisfy Formula (2) below:

$$P/L \tan \theta = 2 \tag{2}$$

Satisfying Formula (2) enables the downsizing of the light-emission surface of the laser source 21, and also enables the light emitted from each laser diode 21A to be incident on only the corresponding one of the coupling lenses 22. Accordingly, the light emitted from each laser diode 21A is prevented from being erroneously incident on another coupling lens adjacent to the corresponding coupling lens. Thus, a decrease in the utilization efficiency of light can be restrained.

Note that the plurality of laser diodes 21A included in the light source unit are preferably arranged on the same substrate. With such an arrangement of the plurality of laser diodes 21A on the same substrate, the area of light emitted from the light source unit can be reduced. Accordingly, vignetting of light in various optical elements on the optical path can be restrained. Thus, the utilization efficiency of light can be enhanced.

In FIGS. 10A and 10B, the first optical system 23 has positive power as a whole, and includes a large-diameter lens 23a and a negative lens 23b in order from the laser source 21 side to the phosphor unit 26 side. The large-diameter lens 23a constitutes a large-diameter element and has positive power. The large-diameter lens 23a is a lens that converges and combines the collimated light beams emitted from the coupling lenses 22. The first optical system 23 including the large-diameter lens 23a and the negative lens 23b guides the light flux of the blue light, which has been substantially collimated by the coupling lens 22 and has been incident on the first optical system 23, to the dichroic mirror 24 while converging the light flux of the blue light.

The dichroic mirror 24 is arranged obliquely with respect to the propagation direction of the blue light emitted from the first optical system 23. More specifically, the dichroic mirror 24 is disposed with the front end portion tilted downward with respect to the propagation direction of the blue light emitted from the first optical system 23. The dichroic mirror 24 has an optical property that is capable of reflecting the blue light substantially collimated by the first optical system 23 and also capable of transmitting the fluorescence light, that is, the second colored light converted by the phosphor unit 26. The dichroic mirror 24 is provided with optical coating having the above-described optical property.

Figure 12:
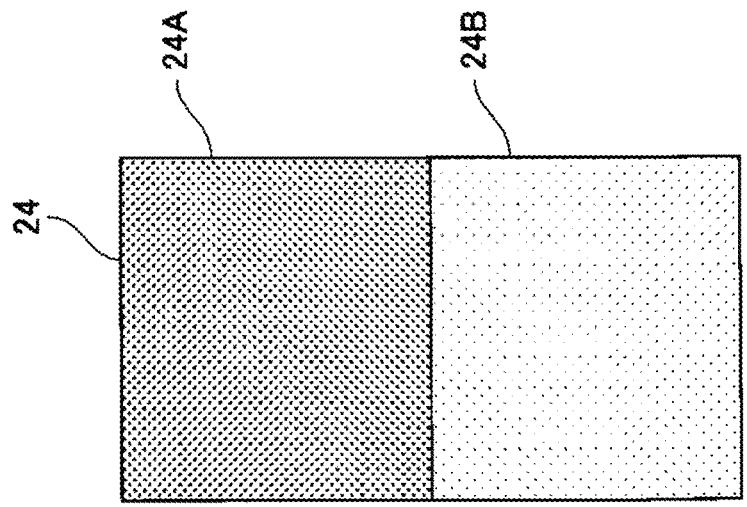
FIG. 12 is a front view of an example of the configuration of a dichroic mirror of the light-source device according to the first embodiment.

FIG. 12 depicts an example of the dichroic mirror 24 of the light-source device 20 according to the first embodiment. FIG. 12 depicts the dichroic mirror 24 as viewed from the incident direction of the blue light emitted from the first optical system 23 side. As illustrated in FIG. 12, the dichroic mirror 24 is divided into two regions 24A and 24B. Hereinafter, for convenience of description, the regions 24A and 24B are referred to as a first region 24A and a second region 24B, respectively.

The first region 24A has the optical property that reflects the blue light emitted from the negative lens 23b of the first optical system 23 while transmitting the fluorescence light converted from the blue light by the phosphor of the phosphor unit 26 to be described later. The first region 24A forms the reflecting surface 102a as illustrated in FIG. 1A. The second region 24B has an optical property capable of transmitting the blue light and the fluorescence light.

The first region 24A is disposed on the optical axis of the first optical system 23, but is not disposed on the optical axis of the second optical system 25, and is disposed in an attitude to approach the first optical system 23 side. The second region 24B is not disposed on the optical axis of the second optical system 25 and is disposed in an attitude to be farther away from the first optical system 23 than the optical axis of the second optical system 25. The second optical system 25 has positive power as a whole, and includes a positive lens 25A and a positive lens 25B in order from the laser source 21 side to the phosphor unit 26 side. The second optical system 25 serves to converge the blue light reflected by the dichroic mirror 24 while guiding the blue light to the phosphor unit 26. Further, the second optical system 25 collimates the fluorescence light (the fluorescence) emitted from the phosphor unit 26. Note that the second optical system 25 is an example of the condensing element.

The blue light guided by the second optical system 25 is incident on the phosphor unit 26. The phosphor unit 26 is a switching unit to switch between a function of reflecting the blue light emitted from the second optical system 25 and a function of causing the blue light to act as excitation light and converting the blue light into fluorescence light having a wavelength range different from that of the blue light by the phosphor. The fluorescence light converted by the phosphor unit 26 is, for example, light in a yellow wavelength band where the center wavelength of the emission intensity is 550 nm.

Figure 13A:
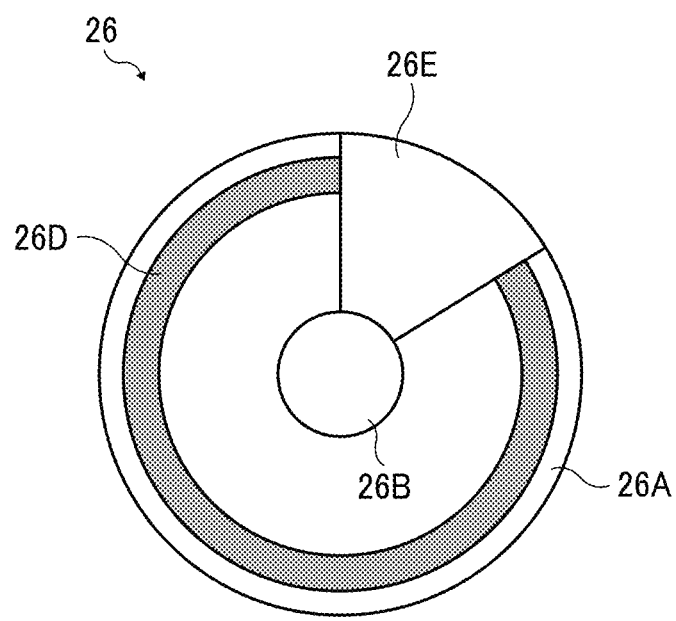
Figure 13B:
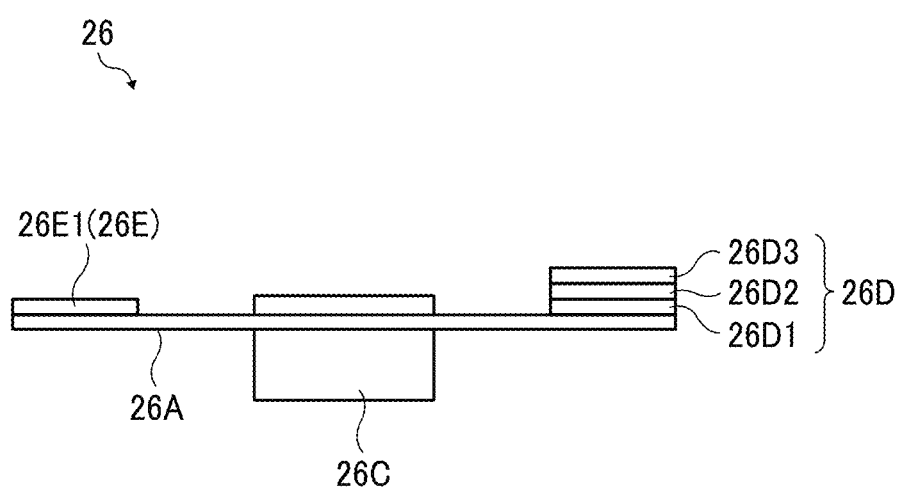

FIGS. 13A and 13B depict the phosphor unit 26 of the light-source device 20 according to the first embodiment. In FIG. 13A, the phosphor unit 26 is viewed from the incident direction of the blue light. In FIG. 13B, the phosphor unit 26 is viewed from the direction orthogonal to the incident direction of the blue light. The configuration of the phosphor unit 26 illustrated in FIGS. 13A and 13B is one example, and the configuration of the phosphor unit according to an embodiment of the present disclosure is not limited to the configuration of FIGS. 13A and 13B, and may be changed where appropriate.

As illustrated in FIGS. 13A and 13B, the phosphor unit 26 includes a disc member 26A serving as a substrate and a drive motor 26C serving as a drive unit. The drive motor 26C has a rotation shaft 26B on a straight line passing through the center of the disc member 26A and perpendicular to the plane of the disc member 26A. The material of the disc member 26A is not limited to a particular material, and may be any suitable material. For example, a transparent substrate or a metallic substrate such as aluminum can be used.

A larger portion of the disc member 26A in the circumferential direction of the phosphor unit 26, for example, an angular range larger than 270° in the first embodiment is assigned to a fluorescent region 26D. A small portion of the disc member 26A in the circumferential direction of the phosphor unit 26, for example, an angular range smaller than 90° in the first embodiment is assigned to an excitation-light reflective region 26E. The excitation-light reflective region 26E constitutes an example of a first region that reflects or diffusely reflects the excitation light reflected by the dichroic mirror 24. The fluorescent region 26D constitutes an example of an area that converts the excitation light reflected by the dichroic mirror 24 into fluorescence light (fluorescence) and emits the fluorescence light. The fluorescent region 26D includes a reflection coat 26D1, a phosphor layer 26D2, and an anti-reflection coat (AR coat) 26D3 layered in this order from a lower-layer side toward an upper-layer side.

The reflection coat 26D1 has a characteristic of reflecting light in a wavelength region of the fluorescence light emitted from the phosphor layer 26D2. When the disc member 26A is made of a metal substrate with high reflectivity, the reflection coat 26D1 may be omitted. In other words, the disc member 26A may have the function of the reflection coat 26D1.

The phosphor layer 26D2 may use, for example, a substance in which a fluorescent material is dispersed into an organic or inorganic binder, a substance in which a crystal of a fluorescent material is directly formed, or a rare-earth phosphor such as a Ce:YAG-based substance. The phosphor layer 26D2 forms an example of a wavelength conversion member that converts at least a portion of the excitation light into fluorescence light having a wavelength different from that of the excitation light and emits the fluorescence light. The wavelength bands of the fluorescence light emitted from the phosphor layer 26D2 may be, for example, yellow, blue, green, and red wavelength bands. In the first embodiment, fluorescence light having a yellow wavelength band is used. While the fluorescence material is used as the wavelength conversion element in this embodiment, a phosphorescent body or a non-linear optical crystal may be used.

The anti-reflection coat 26D3 has a characteristic of preventing reflection of light at a surface of the phosphor layer 26D2.

A reflection coat 26E1 having a characteristic of reflecting light in the wavelength region of the blue light guided from the second optical system 25 is layered on the excitation-light reflective region 26E. Therefore, the excitation-light reflective region 26E is a reflecting surface. When the disc member 26A is made of a metal substrate with high reflectivity, the reflection coat 26E1 may be omitted. In other words, the disc member 26A itself may have the function of the reflection coat 26E1.

When the disc member 26A is rotationally driven by the drive motor 26C while the phosphor unit 26 is irradiated with blue light (referred to as "first color light"), the irradiation position of the blue light with respect to the phosphor unit 26 moves with time. Accordingly, a portion of the blue light incident on the phosphor unit 26 is converted into fluorescence light (referred to as "second color light") having a wavelength different from the wavelength of the blue light in the fluorescent region 26D, which is a wavelength conversion region, and is emitted. The other portion of the blue light incident on the phosphor unit 26 is reflected by the excitation-light reflective region 26E without a change from the blue light. Here, "a portion of the blue light" and "the other portion of the blue light" mean a portion and the other portion divided on the time axis.

The number, range, and the like of the fluorescent region 26D and the excitation-light reflective region 26E have degrees of freedom, and various design changes can be made. For example, two fluorescent regions and two excitation-light reflective regions may be alternately arranged in the circumferential direction at intervals of 90°.

Returning to FIGS. 10A and 10B, the configuration of the light-source device 20 are further described. The refractive optical system 27 is a lens that condenses (converges) blue light and fluorescence light emitted from the second optical system 25. The light emitted from the phosphor unit 26 passes through the dichroic mirror 24, is refracted and condensed by the refractive optical system 27, and is incident on the color wheel 28 (see FIG. 9). The color wheel 28 separates the blue light and fluorescence light (fluorescence) generated by the phosphor unit 26 into desired colors.

Figure 14A:
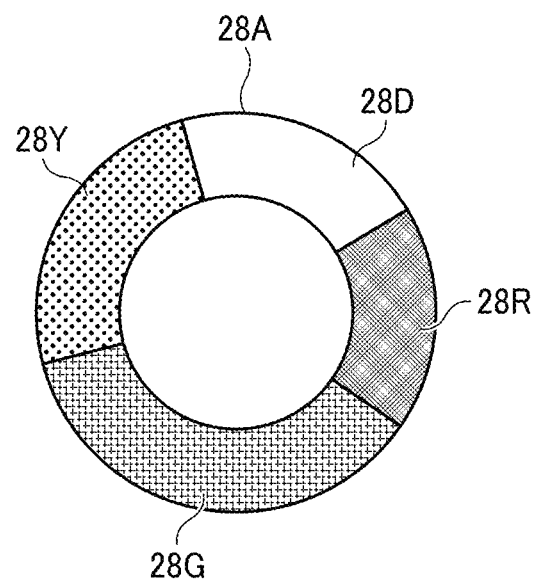
Figure 14B:
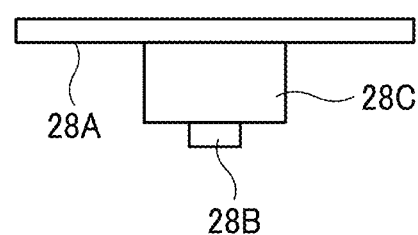

FIGS. 14A and 14B are illustrations of a schematic configuration of the color wheel 28 of the light-source device 20 according to the first embodiment. In FIG. 14A, the color wheel 28 is viewed from the incident direction of the blue light and the fluorescence light. In FIG. 14B, the color wheel 28 is viewed from the direction orthogonal to the incident direction of the blue light and the fluorescence light. As illustrated in FIG. 14B, the color wheel 28 includes an annular member 28A, a rotation shaft 28B, and a drive motor 28C as a drive unit that drives the annular member 28A to rotate about the rotation shaft 28B.

The annular member 28A includes a plurality of regions partitioned along the circumferential direction, that is, a diffusion region 28D and three filter regions 28R, 28G, and 28Y. The diffusion region 28D is a region that transmits and diffuses the blue light emitted from the phosphor unit 26. The filter region 28R is a region that transmits light having the wavelength range of the red component of the fluorescence light emitted from the phosphor unit 26. Similarly, the filter regions 28G and 28Y are regions that transmit light having the wavelength range of the green component and light having the wavelength range of the yellow component of the fluorescence light emitted from the phosphor unit 26, respectively.

In the above description, it is assumed that the color wheel 28 has regions through which the red, green, and yellow components of the fluorescence light are transmitted. However, the configuration of the color wheel 28 is not limited thereto. For example, the color wheel 28 may have regions through which a red component and a green component of the fluorescence light are transmitted.

The area ratio between the regions in the color wheel 28 is determined based on design specification of the projector 1. The blue light emitted from the phosphor unit 26 is transmitted through the diffusion region 28D of the color wheel 28. Therefore, the ratio of the area of the excitation-light reflective region 26E to the total area of the disc member 26A of the phosphor unit 26 and the ratio of the area of the diffusion region 28D to the total area of the color wheel 28 preferably coincide with each other.

The drive motor 28C rotationally drives the annular member 28A in the circumferential direction. When the annular member 28A rotates in the circumferential direction, the blue light emitted from the phosphor unit 26 sequentially enters the diffusion region 28D and the filter regions 28R, 28G, and 28Y. The blue light and the fluorescence light emitted from the phosphor unit 26 is transmitted through the color wheel 28, so that the blue light, green light, red light, and yellow light are sequentially emitted from the color wheel 28. The light transmitted through each region of the color wheel 28 is then incident on the light tunnel 29.

The light tunnel 29 is an optical element in which four mirrors form inner surfaces of a quadrangular prism. The light tunnel 29 serves as a light mixing element to cause the light incident on one end of the quadrangular prism to be reflected plural times by the inner mirrors so as to make the distribution of the light uniform. The light tunnel 29 is disposed to enable the blue light and fluorescence light condensed by the refractive optical system 27 to be incident on the light tunnel 29. In the first embodiment, the light tunnel 29 is used as an example of the light mixing element. However, no limitation is intended thereby. Alternatively, the light tunnel 29 may be, for example, a rod integrator or a fly-eye lens.

Figure 15A:
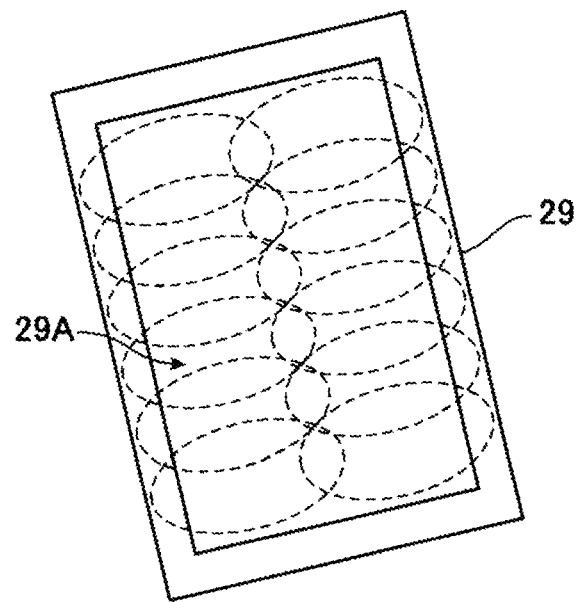
FIGS. 15A and 15B are illustrations of a light tunnel included in the light-source device according to the first embodiment, in which 15A is a pattern diagram of an example of incidence of light on an incident aperture, and 15B is a pattern diagram of another example of incidence of light on the incident aperture of the light tunnel
Figure 15B:
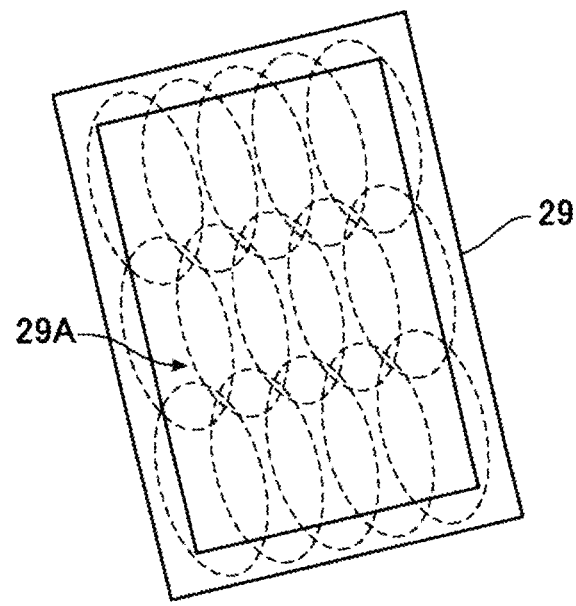

FIGS. 15A and 15B depicts two examples of an incident aperture 29A of the light tunnel 29 in the light-source device 20 according to the first embodiment, as viewed from the incident direction of light. FIGS. 15A and 15B each indicates a projection range of the blue light projected onto the incident aperture 29A of the light tunnel 29. The light tunnel 29 is arranged slightly tilted as illustrated in FIGS. 15A and 15B. The tilt angle of the light tunnel 29 is determined depending on a desired performance of the light-source device 20.

As described above, the light source unit of the light-source device 20 according to the first embodiment includes the laser source 21 in which the laser diodes 21A are arranged in array. As illustrated in FIGS. 15A and 15B, the projection cross section of the blue light or the like emitted from the laser diode 21A and projected onto the incident aperture 29A of the light tunnel 29 is elliptical. In the example illustrated in FIG. 15A, the long axes of the elliptical projection cross sections of the blue light and the like projected on the incident aperture 29A are arranged to be substantially parallel to the short sides of the incident aperture 29A. With such an arrangement of the projection ranges of the blue light or the like on the incident aperture 29A, the occurrence of the vignetting of the blue light or the like in the light tunnel 29 can be prevented.

As illustrated in FIG. 15B, the projection range of the blue light or the like on the incident aperture 29A may be arranged such that the major axes of the elliptical projection cross sections are substantially parallel to the long sides of the incident aperture 29A. In the present embodiment, the elliptical shape refers to a shape having a difference between the full width at half maximum (FWHM) of the intensity distribution in the vertical direction of the projection range and the full width at half maximum (FWHM) of the intensity distribution in the horizontal direction. In other words, the elliptical shape is a shape without an isotropic intensity distribution.

The optical path of the blue light (hereinafter referred to as blue light optical path) in the light-source device 20 having such a configuration is described below. The blue light path is an optical path of some light rays of the excitation light emitted from the laser source 21 illustrated in FIGS. 10A and 10B. The light rays are reflected by the excitation-light reflective region 26E (see FIG. 13A) of the phosphor unit 26.

The blue light emitted from the laser source 21 is converted by the coupling lens 22 into parallel light. The blue light emitted from the coupling lens 22 is condensed and combined by the large-diameter lens 23a of the first optical system 23, and is then incident on the dichroic mirror 24 as condensed light through the negative lens 23b. The dichroic mirror 24 reflects the incident light in the first region 24A, and the reflected light is directed to the second optical system 25. The first region 24A constitutes the reflecting surface 102a that reflects the blue light emitted from the laser source 21 (see FIGS. 1A and 1B). The point P at the center of the projection image of the excitation light described above is formed in the first region 24A.

As described above, the first region 24A of the dichroic mirror 24 is disposed closer to the first optical system 23 relative to the optical axis of the second optical system 25. With this arrangement, the blue light path is incident on a portion of the second optical system 25, specifically, a portion of the positive lens 25A on the side closer to the first optical system 23. The blue light travels so as to approach the optical axis of the second optical system 25 while forming an angle with respect to the optical axis of the second optical system 25 and is emitted from the second optical system 25, specifically, the positive lens 25B. The blue light emitted from the second optical system 25 is incident on the phosphor unit 26.

When the blue light traveling toward the phosphor unit 26 is incident on the excitation-light reflective region 26E, the blue light is regularly reflected by the excitation-light reflective region 26E. The blue light regularly reflected by the excitation-light reflective region 26E is incident on the second optical system 25, specifically, a portion of the positive lens 25B on the side opposite to the side closer to the first optical system 23. Then, the blue light travels away from the optical axis of the second optical system 25 while forming an angle with respect to the optical axis of the second optical system 25 and is emitted from the second optical system 25, specifically, the positive lens 25A.

The blue light emitted from the positive lens 25A of the second optical system 25 passes through the second region 24B of the dichroic mirror 24. The light flux of the blue light regularly reflected by the phosphor unit 26 or the light flux of the blue light emitted from the second optical system 25 and transmitted through the second region 24B of the dichroic mirror 24 constitutes the above-described light flux Q of the excitation light. As described above, the second region 24B of the dichroic mirror 24 has an optical property that transmits the excitation light and the fluorescence light. Such a configuration can restrain a decrease in the utilization efficiency of light even when the light flux (light flux Q) of the blue light intersects with the dichroic mirror 24.

The blue light transmitted through the second region 24B of the dichroic mirror 24 is incident on the refractive optical system 27. The blue light travels so as to approach the optical axis of the refractive optical system 27 while forming an angle with respect to the optical axis of the refractive optical system 27 and is incident on the light tunnel 29 through the color wheel 28 illustrated in FIG. 9. The blue light is reflected plural times inside the light tunnel 29 and homogenized (made uniform), and is then incident on the illumination optical system 30 outside the light-source device 20.

Next, the optical path of the fluorescence light (hereinafter, appropriately referred to as a fluorescence light path) in the light-source device 20 is described according to the present embodiment with reference to FIG. 10B. In FIG. 10B, a part of the optical path of the fluorescence light is omitted for convenience of illustration. The fluorescence light path is an optical path of some other light rays of the excitation light emitted from the laser source 21, the wavelength of the some other light rays to be converted by the fluorescent region 26D of the phosphor unit 26.

Until the blue light emitted from the laser source 21 is guided to the phosphor unit 26, the fluorescence light path is identical with the blue light path described above. In this case, it is assumed that the blue light incident on the phosphor unit 26 is incident on the fluorescent region 26D. The blue light incident on the fluorescent region 26D serves as excitation light for the phosphor. The phosphor converts the wavelength of the blue light so that the fluorescence light including, for example, a yellow wavelength band is generated and the fluorescence light is reflected by the reflection coat 26D1 and the phosphor layer 26D2 to thus exhibit Lambertian reflectance.

The fluorescence light Lambertian-reflected by the fluorescent region 26D is converted by the second optical system 25 into parallel light. The fluorescence light emitted from the second optical system 25 passes through the dichroic mirror 24 and is incident on the refractive optical system 27. The fluorescence light advances so as to approach the optical axis of the refractive optical system 27 while forming an angle with respect to the optical axis of the refractive optical system 27, and is incident on the light tunnel 29 through the color wheel 28. The fluorescence light is reflected plural times inside the light tunnel 29 and homogenized (made uniform), and is then incident on the illumination optical system 30 outside the light-source device 20.

As described above, in the light-source device 20 according to the first embodiment, the optical path of the blue light emitted from the laser source 21 differs between before and after the reflection by the phosphor unit 26. More specific description is as follows. A point of the center of a projection image of the blue light projected on the first region 24A of the dichroic mirror 24 from the laser source 21 is determined. The point of the center of the projection image is indicated by the point P in FIG. 1A. The blue light path is formed so as to prevent the point P from intersecting with the light flux (light flux Q in FIG. 1A) of the blue light reflected from the phosphor unit 26. Such a configuration can prevent the blue light from passing through the same portion on the dichroic mirror 24, prevent the dichroic mirror 24 from being damaged due to an increase in light condensing density, and enhance reliability.

Such a configuration can also obviate the necessity of a particular optical element a polarization splitter formed of, e.g., a phase-contrast plate or a polarization beam splitter to separate the optical path of the blue light emitted from the phosphor unit 26, from the other optical path. Accordingly, the number of components and the cost for producing the device can be reduced, thus achieving a reduction in the size of the light-source device 20. Further, since optical components such as a phase-contrast plate and a polarization splitter are not used to operate the polarization of light, a decrease in the utilization efficiency of light due to the reflectivity, transparency, and absorptance of the optical components can be substantially prevented.

In the light-source device 20 according to the first embodiment, the blue light emitted from the laser source 21 is a linearly polarized laser beam whose polarization direction is a specific direction. The light source units including the plurality of laser sources 21 are arranged so that the directions of the linearly polarized light are all the same, and the directions of the linearly polarized light of the light emitted from the light source units are aligned. The direction of each linearly polarized laser beam can be determined by the direction in which the light source unit is arranged.

As illustrated in FIGS. 15A and 15B, if the light source unit is tilted according to the tilt of the light tunnel 29, the direction of each linearly polarized laser beam varies. In such a situation where the direction of the linearly polarized laser beam varies, if the polarization of light is controlled by using, for example, a polarization splitter, the utilization efficiency of light might decrease when the light passes through the polarization splitter. Since the polarization of light is not controlled in the light-source device 20 according to the first embodiment, the decrease in the utilization efficiency of light due to the tilt of the laser source 21 can be prevented.

Second Embodiment

Figure 16A:
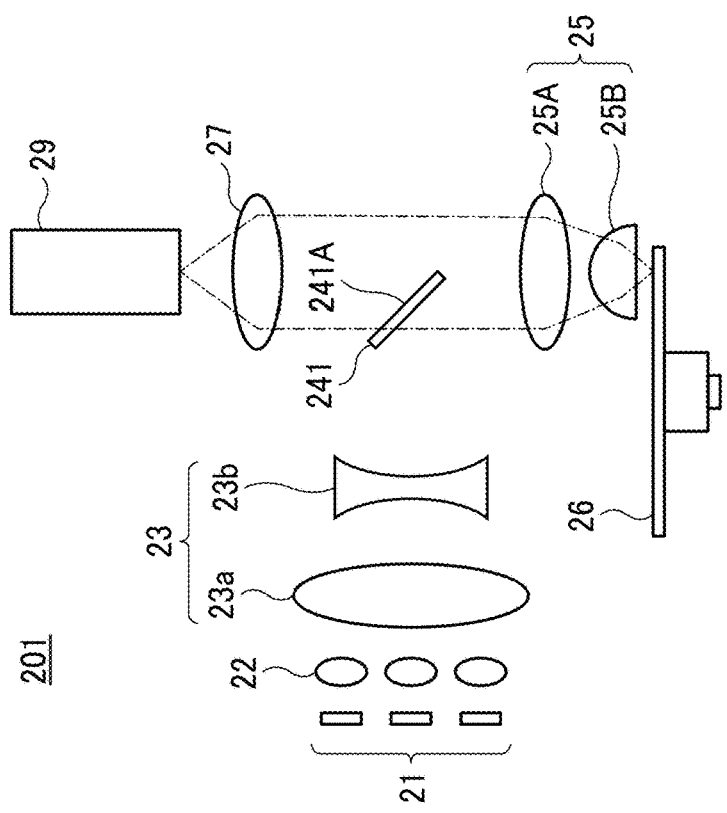
Figure 16B:
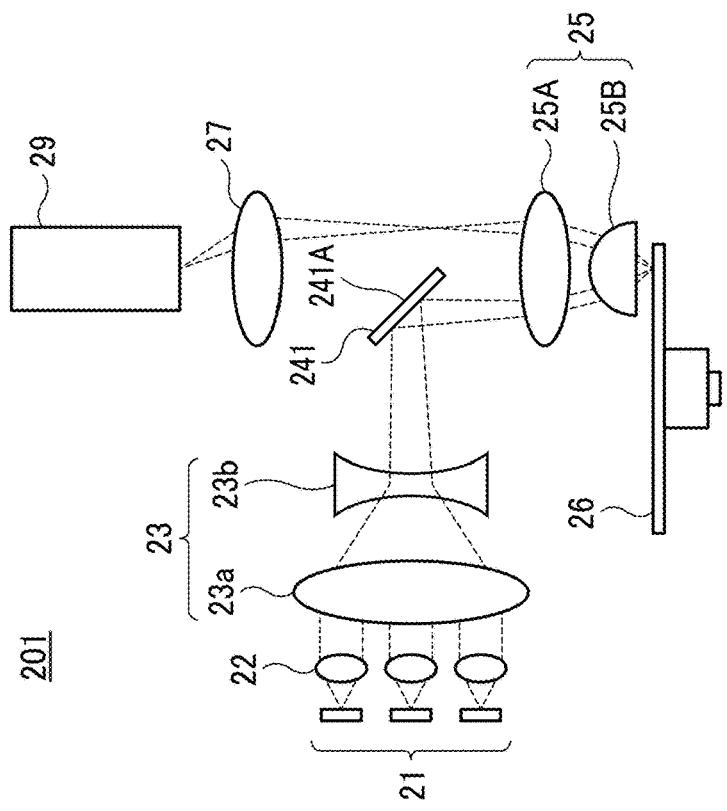

A light-source device 201 according to a second embodiment differs in the configuration of the dichroic mirror from the light-source device 20 according to the first embodiment. Hereinafter, the configuration of the light-source device 201 according to the second embodiment illustrated in FIGS. 16A and 16B is described below, focusing on differences from the light-source device 20 according to the first embodiment. FIG. 16A depicts the optical path of the blue light in the light-source device 201. FIG. 16B depicts the optical path of the fluorescence light in the light-source device 201. In FIGS. 16A and 16B, the same reference numerals are given to the same components as the components of the first embodiment, and redundant description thereof is omitted. In FIG. 16B, a part of the optical path of the fluorescence light is omitted for convenience of illustration.

A light-source device 201 illustrated in FIGS. 16A and 16B is different from the light-source device 20 according to the first embodiment only in the configuration of a dichroic mirror 241. The dichroic mirror 241 is arranged to be tilted in the same manner as in the dichroic mirror 24. However, the dichroic mirror 241 has a shorter length than the dichroic mirror 24. Since the dichroic mirror 24 have a shorter length, the size of the light-source device 20 can be reduced. The dichroic mirror 241 has the same optical properties as the first region 24A that is a part of the dichroic mirror 24 described above.

Figure 17:
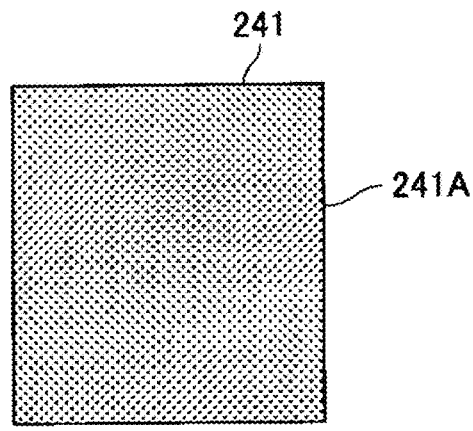
FIG. 17 is a front view of an example of a configuration of a dichroic mirror applicable to the light-source device according to the second embodiment.

FIG. 17 depicts an example of the configuration of the dichroic mirror 241 of the light-source device 201 according to the second embodiment. FIG. 17 depicts the dichroic mirror 241 as viewed from the incident direction of the blue light (excitation light) emitted from the first optical system 23 side. The dichroic mirror 241 is formed of only a single region 241A.

Similarly to the first region 24A according to the second embodiment, the region 241A has the optical property that reflects the blue light emitted from the first optical system 23 while transmitting the fluorescence light converted from the blue light by the phosphor of the phosphor unit 26. The region 241A is disposed at the same position as the first region 24A. That is, the region 241A is disposed on the optical path of the first optical system 23. However, the region 241A is disposed at a position shifted from the optical axis of the second optical system 25 toward the first optical system 23.

The blue light path and the fluorescence light path in the light-source device 201 having such a configuration is described with reference to FIGS. 16A and 16B. As illustrated in FIG. 16A, the blue light emitted from the laser source 21 is reflected by the excitation-light reflective region 26E of the phosphor unit 26 and emitted to the second optical system 25. Up to this point, the blue light optical path is the same as that of the first embodiment. In the light-source device 201 according to the second embodiment, the blue light emitted from the second optical system 25 does not pass through the dichroic mirror 241. The light flux of the blue light (corresponding to the light flux Q illustrated in FIG. 1A) emitted from the phosphor unit 26 does not intersect the dichroic mirror 24. On the other hand, as illustrated in FIG. 16B, the fluorescence light path is similar to, even if not the same as, the fluorescence light path of the first embodiment.

In the light-source device 201 according to the second embodiment, the optical path of the blue light emitted from the laser source 21 is different before and after reflection by the phosphor unit 26. Accordingly, similarly to the light-source device 20 according to the first embodiment, the reliability of the light-source device can be enhanced and the size and cost of the light-source device can be reduced.

Particularly, in the light-source device 201, the width of the dichroic mirror 241 can be smaller than the width of the second optical system 25. Accordingly, the size of the light-source device 201 can be reduced. Further, in the light-source device 201, the optical path of the blue light reflected by the phosphor unit 26 does not pass through the dichroic mirror 241. Such a configuration can restrain a decrease in the utilization efficiency of light due to the transparency of the dichroic mirror 241.

Third Embodiment

Figure 18A:
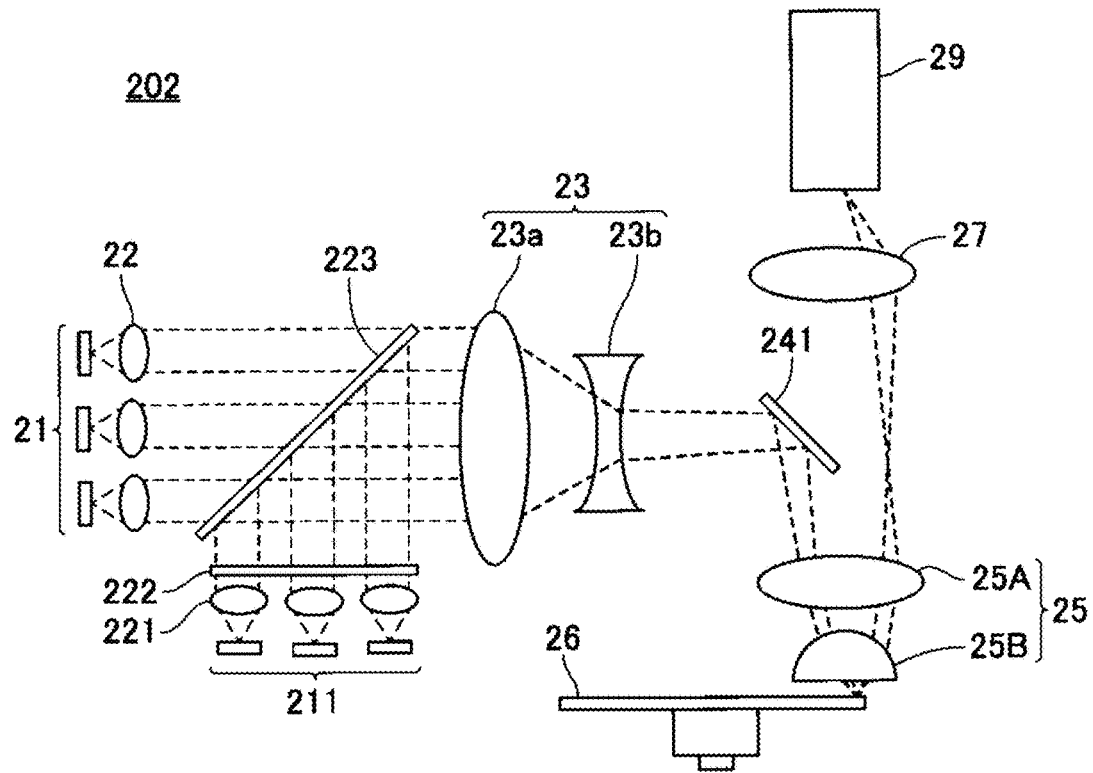
Figure 18B:
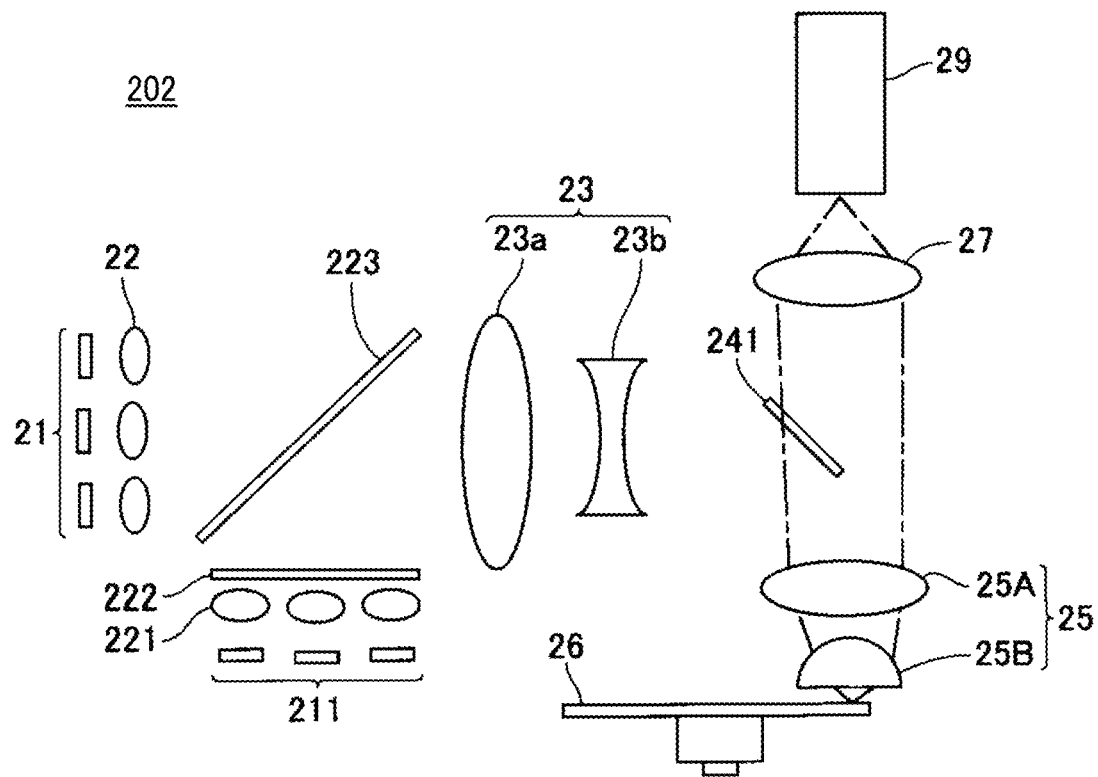

Next, a light-source device 202 according to a third embodiment illustrated in FIGS. 18A and 18B is described. The light-source device 202 is different from the light-source device 201 according to the second embodiment in that the light-source device 202 includes a first light source unit and a second light source unit and that the light-source device 202 includes a polarization optical component to combine the excitation light from the second light source unit with the excitation light from the first light source unit. The first light source unit includes a laser source 21 and a coupling lens 22. The second light source unit includes a laser source 211 and a coupling lens 221.

FIG. 18A indicates the optical path of the blue laser beam in the light-source device 202 according to the third embodiment. FIG. 18B indicates the optical path of the fluorescence light in the light-source device 202 according to the third embodiment. In FIGS. 18A and 18B, the same reference numerals are given to the same components as the components of the second embodiment, and redundant description thereof is omitted. In FIG. 18B, a part of the optical path of the fluorescence light is omitted for convenience of illustration.

As illustrated FIGS. 18A and 18B, the light-source device 202 includes a laser source 211 and coupling lenses 221, which constitute the second light source unit. The second light source unit is arranged so that the laser beams emitted from the laser source 211 are orthogonal to the laser beams emitted from the laser source 21 of the first light source unit.

The laser source 211 has the same configuration as the laser source 21. In other words, in the laser source 211, laser diodes as light sources that emit a plurality of laser beams are arranged in array. The laser source 211 emits, for example, blue light in a blue band where the center wavelength of emission intensity is 455 nm. In this case, each of the laser sources 21 and 211 is configured to emit P-polarized light. In a similar manner to the coupling lens 22, the coupling lens 221 is a lens that receives blue light emitted from the laser source 211 and converts the blue light into parallel light, that is, collimated light.

The light-source device 202 includes a half-wave retarder 222 and a polarization splitter 223 that constitute a polarization optical component. The half-wave retarder 222 is arranged to face the plurality of coupling lenses 221. The half-wave retarder 222 converts a P-polarized component of blue light emitted from the laser source 211 into an S-polarized component. The polarization splitter 223 is disposed in the optical path of the blue light emitted from the laser source 21 and the blue light emitted from the laser source 211. The polarization splitter 223 has an optical property that reflects the S-polarized component of the blue light while transmitting the P-polarized component of the blue light.

The P-polarized component of the blue light emitted from the laser source 21 passes through the polarization splitter 223 and is incident on the large-diameter lens 23a of the first optical system 23. After the P-polarized component of the blue light emitted from the laser source 211 is converted into the S-polarized light by the half-wave retarder 222, the S-polarized light is reflected by the polarization splitter 223 and is incident on the large-diameter lens 23a of the first optical system 23. Thus, the excitation light of blue from the second light source unit is combined with the excitation light of blue from the first light source unit.

The blue light optical path and the fluorescence light path of the light-source device 202 having such a configuration are described with reference to FIGS. 18A and 18B. As illustrated in FIGS. 18A and 18B, the blue light path and the fluorescence light path after being combined by the polarization splitter 223 and incident on the large-diameter lens 23a of the first optical system 23 are similar to, even if not the same as, those in the second embodiment.

In the light-source device 202 according to the third embodiment, the optical path of the blue light emitted from the laser source 21 is different before and after reflection by the phosphor unit 26. Accordingly, similarly to the light-source device 201 according to the second embodiment, good reliability can be obtained and size and cost reduction can be achieved. Particularly, in the light-source device 202, since the excitation light from the second light source unit is combined with the excitation light from the first light source unit, the luminance of the excitation light can be increased, and the utilization efficiency of light can be enhanced. Further, since the polarization is controlled by the half-wave retarder 222 and the polarization splitter 223 constituting the polarization optical component, the optical paths can be separated from and combined with each other regardless of the presence or absence of the polarization component of the light emitted from the light source.

Fourth Embodiment

Next, a light-source device 203 according to a fourth embodiment illustrated in FIG. 19 is described. The light-source device 203 is different from the light-source device 201 according to the second embodiment in that the light-source device 203 includes a phosphor unit 261 different from the phosphor unit 26. Hereinafter, the configuration of the light-source device 203 according to the fourth embodiment is described below, focusing on differences from the light-source device 201 according to the second embodiment.

Figure 19A:
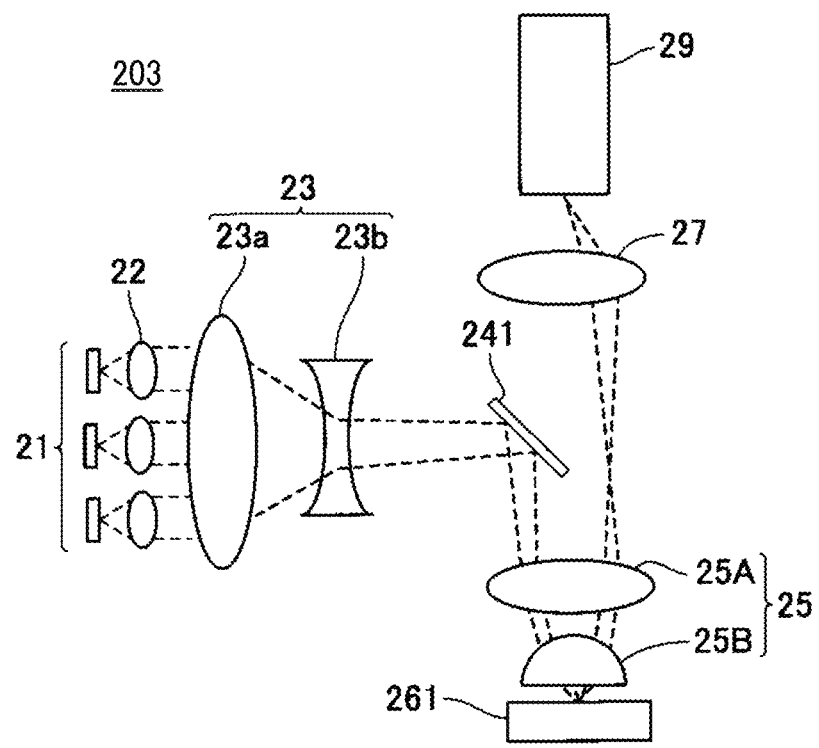
Figure 19B:
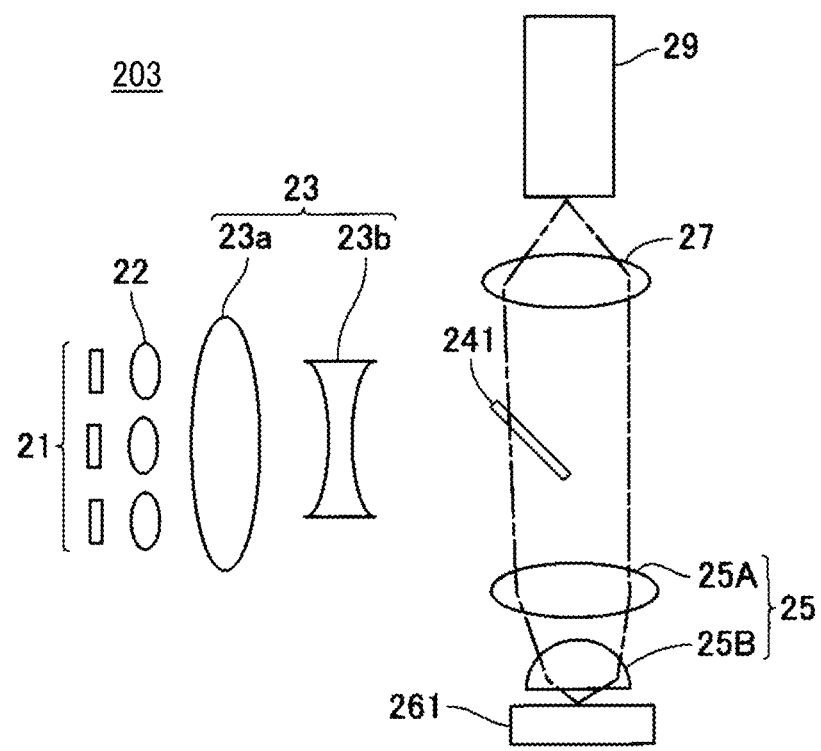

FIG. 19A depicts the optical path of a blue laser beam in the light-source device 203. FIG. 19B depicts the optical path of fluorescence light in the light-source device 203. In FIGS. 19A and 19B, the same reference numerals are given to the same components as the components of the second embodiment, and redundant description thereof is omitted. In FIG. 19B, a part of the optical path of the fluorescence light is omitted for convenience of illustration.

The light-source device 203 according to the fourth embodiment includes a phosphor unit 261 (hereinafter, referred to as a stationary phosphor unit where appropriate) that is not driven to rotate, instead of the phosphor unit 26 that is driven to rotate. The stationary phosphor unit 261 reflects a portion of the blue light (excitation light) emitted from the laser source 21 with a change from the blue light. The stationary phosphor unit 261 converts the other portions of the blue light into fluorescence light and emits the fluorescence light.

Figure 20:
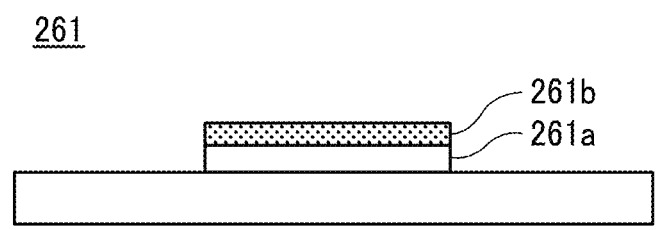
FIG. 20 is a schematic side view of a configuration of a phosphor unit included in the light-source device according to the fourth embodiment.

FIG. 20 depicts a configuration of the stationary phosphor unit 261 in the light-source device 203 according to the fourth embodiment. FIG. 20 depicts the stationary phosphor unit 261 viewed from a direction perpendicular to the incident direction of the blue light. As illustrated in FIG. 20, the stationary phosphor unit 261 is configured by stacking a phosphor 261b as the wavelength conversion member on a reflection member 261a that reflects excitation light. For example, the reflection member 261a and the phosphor 261b have a rectangular shape in plan view. The phosphor 261b is applied on the reflection member 261a.

The phosphor 261b converts, for example, 80% of the incident blue light (excitation light) into fluorescence light. Once the blue light is incident on the stationary phosphor unit 261, 80% of the blue light acts as excitation light for the phosphor 261b, and the wavelength of the blue light is converted with the phosphor 261b. As a result, the fluorescence light including, for example, a yellow wavelength band where the center wavelength of emission intensity is 550 nm is generated, and the fluorescence light is Lambertian-reflected by the phosphor 261b and the reflection member 261a.

For example, 20% of the blue light (excitation light) incident on the stationary phosphor unit 261 does not act as excitation light and is reflected by the reflection member 261a. As a result, once the blue light is incident on the stationary phosphor unit 261, the blue light and the fluorescence light are emitted from the stationary phosphor unit 261 simultaneously.

The blue light optical path and the fluorescence light path in the light-source device 203 having the above-described configuration are described with reference to FIGS. 19A and 19B. As illustrated in FIGS. 19A and 19B, the blue light path and the fluorescence light path in the light-source device 203 are the same as those in the second embodiment except for the wavelength conversion and reflection in the stationary phosphor unit 261.

In the light-source device 203 according to the fourth embodiment, the optical path of the blue light emitted from the laser source 21 is different before and after reflection by the stationary phosphor unit 261. Accordingly, similarly to the light-source device 201 according to the second embodiment, good reliability can be obtained and size and cost reduction can be achieved. Particularly, in the light-source device 203, since the blue light and the fluorescence light are emitted simultaneously by the stationary phosphor unit 261, there is no need to drive the phosphor unit to rotate, and the manufacturing cost of the device can be reduced. Since the motor for rotational driving is not used, noise can be reduced a decrease in reliability due to the life of the motor is prevented.

Fifth Embodiment

Figure 21:
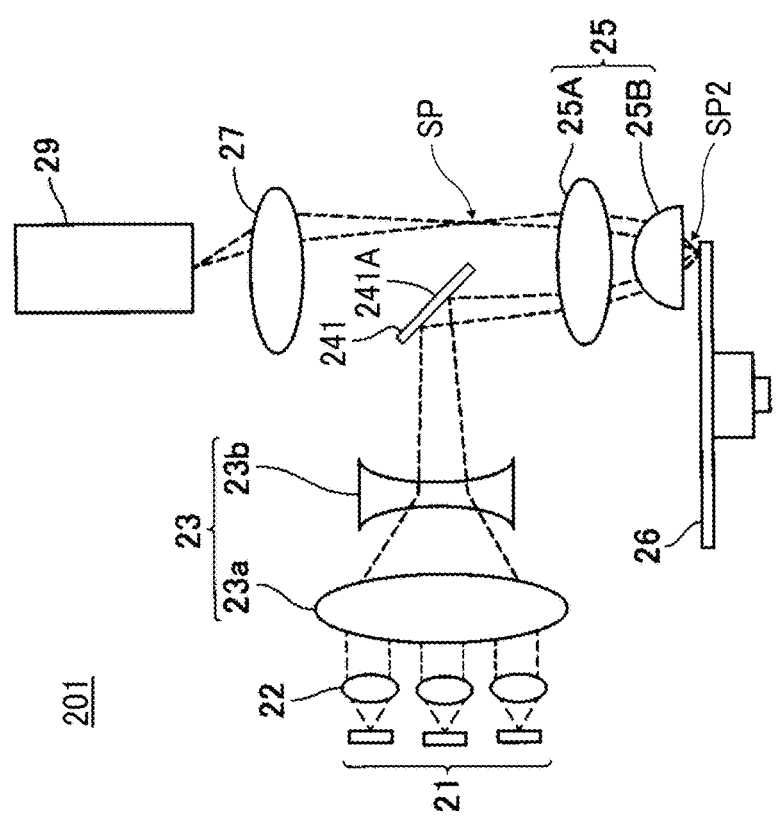
FIG. 21 is a schematic diagram of an optical arrangement of a light-source device according to a fifth embodiment of the present disclosure.

Next, a light-source device according to a fifth embodiment illustrated in FIG. 21 is described. The same reference numerals are given to the same components as those of the above-described embodiments. As illustrated in FIG. 21, light fluxes emitted from the plurality of laser sources 21 are converged and guided to the dichroic mirror 24. The light fluxes emitted from the light sources 21 are condensed by the corresponding coupling lenses 22 respectively into substantially parallel light beams and are guided to the first optical system 23. The first optical system 23 further condenses the bundle of the plurality of light fluxes emitted from the respective coupling lenses 22, makes the bundle narrower than the total width of light fluxes, and guides the bundle to the dichroic mirror 24.

Even after the bundle of light fluxes is reflected by the dichroic mirror 24, the total width of light fluxes does not increase, passes through the second optical system 25, is most condensed in the vicinity of the reflecting surface of the phosphor unit 26, and is regularly reflected by the reflective region of the phosphor unit 26. The light flux having been reflected by the reflection region of the phosphor unit 26 reaches the second optical system 25 again while spreading. The second optical system 25 is optimized so as to be smaller than the light flux width on the exit surface of the positive lens 25A by the condensing function.

The second optical system 25 has a light condensing point (SP) at which the width of the light flux is once reduced when the light flux emitted from the second optical system 25 passes through the dichroic mirror 24. That is, the total light flux width A formed by the plurality of light fluxes emitted from the plurality of light sources 21 is condensed by the first optical system 23, and the light flux width B smaller than the light flux width A is formed at the reflection portion of the dichroic mirror 24. The light is condensed and reflected in the vicinity of the phosphor unit 26 by the second optical system 25, and the width of the light flux is once widened when the light flux travels toward the second optical system 25 again. The expanded light flux width is condensed again by the condensing function of the second optical system 25, and the light condensing point SP is provided between the second optical system 25 and the refractive optical system 27. As described above, the light is condensed in the vicinity of the phosphor unit 26 at another light condensing point SP2 that is different from the light condensing point SP and provided between the second optical system 25 and the phosphor unit 26.

As described above, a feature of the present embodiment is in that the light condensing point SP is provided between the second optical system 25 and the refractive optical system 27 for the light flux reflected by the phosphor unit 26. With such a configuration, the light flux emitted from the phosphor unit 26 serving as a wavelength converter can be prevented from interfering with the first region 24A of the dichroic mirror 24 or the reflecting surface 102a that reflects blue light in the embodiment illustrated in FIGS. 1A and 1B. Thus, a bright illumination device with high efficiency can be provided, and the housing of the light source unit can be reduced in size by narrowing the light flux width on the optical path, which contributes to downsizing of the device.

Further, the optical element closest to the light condensing point SP is the dichroic mirror 24. Such a configuration contributes to further downsizing.

The position of the light condensing point SP is the position of the light flux after passing through the reflecting surface of the dichroic mirror 24 or a virtual plane including the reflecting surface. Such a configuration can avoid the position of the second region 24B of the dichroic mirror 24 where the light flux is most condensed. Since the dichroic mirror 24 is basically transmissive and reflective, the dichroic mirror 24 does not absorb light. However, depending on the material of the transparent substrate, the transparent substrate absorbs light. If foreign matter such as dust adheres to the surface of the transparent substrate and the condensed light reaches the surface of the transmissive substrate, the foreign matter might burn and reduce the transmittance of the surface, which might cause damage. Therefore, in the embodiment illustrated in FIG. 21, the position of the condensing point SP is away from the position of the dichroic mirror 24. Similarly, in the embodiment illustrated in FIG. 21, the position of another light condensing point SP2 is in the vicinity of the phosphor unit 26 and is away from the position of the phosphor unit 26. Such a configuration can more effectively prevent the temperature rise of the phosphor unit 26 than a configuration in which light is condensed on the phosphor unit 26.

Figure 22:
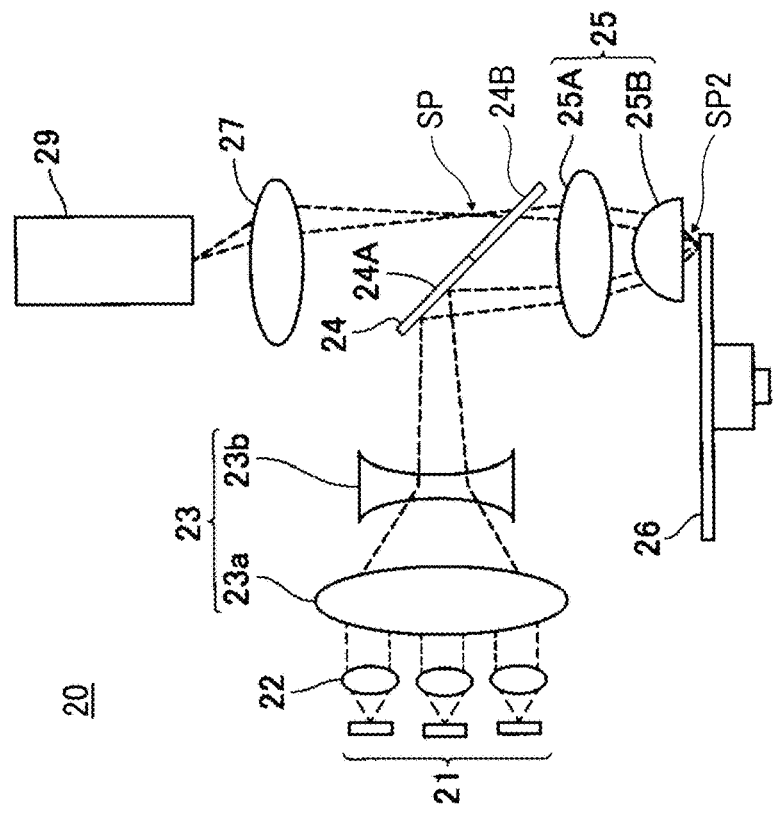
FIG. 22 is a schematic diagram of an optical arrangement of a light-source device according to a modification of the fifth embodiment.

FIG. 22 depicts a modification of the sixth embodiment. In the modification illustrated in FIG. 22, a dichroic mirror 241 corresponding to the dichroic mirror 24 in the embodiment illustrated in FIG. 21 is shortened in the cross section illustrated in FIG. 22.

In FIG. 22, the total light flux width A formed by a plurality of light fluxes emitted from a plurality of light sources 21 is condensed by a first optical system 23, and the light flux width B smaller than the light flux width A is formed at the reflection portion of the dichroic mirror 241. Further, the light fluxes are condensed in the vicinity of a phosphor unit 26 by a second optical system 25 and reflected by the phosphor unit 26. When the light flux travels from the phosphor unit 26 to the second optical system 25 again, the light flux width that has once expanded is condensed again on a light condensing point SP by the condensing function of the second optical system 25. The light condensing point SP is provided with each optical element so as to be positioned between the second optical system 25 and the refractive optical system 27, and the present embodiment is characterized by having such a configuration.

Since the width of the blue light flux reflected by the phosphor unit 26 is minimized in the vicinity of the dichroic mirror 241, interference between the light flux and the dichroic mirror 241 can be prevented. Thus, a high-efficiency and bright illumination device can be provided, and the housing of the light source unit can be reduced in size by narrowing the width of the light flux on the optical path, which also contributes to downsizing of the device.

Sixth Embodiment

Figure 23:
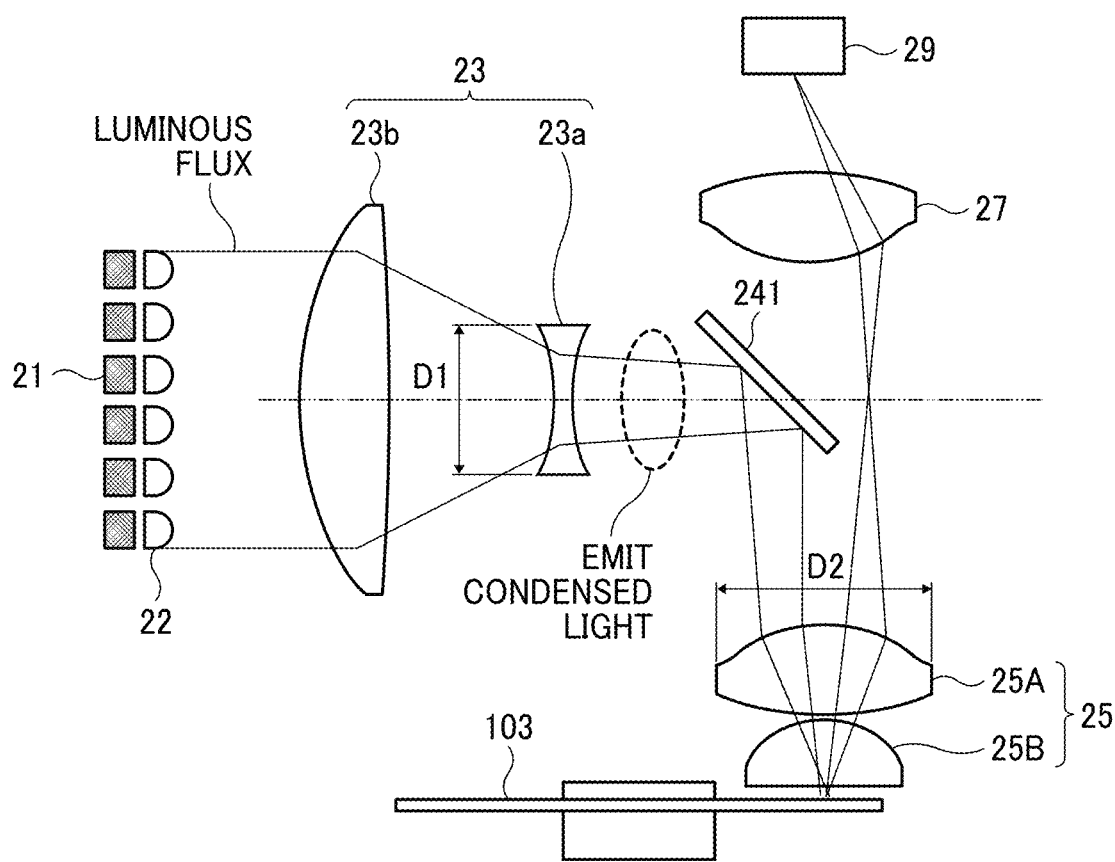
FIG. 23 is a schematic diagram of an optical arrangement of a light-source device according to a sixth embodiment of the present disclosure.

FIG. 23 depicts a light-source device according to a fifth embodiment. In the present embodiment, the same components as those of the above-described embodiments are denoted by the same reference numerals. In FIG. 23, the excitation light emitted from a plurality of laser sources 21 serving as a plurality of light sources is converted into substantially parallel light by a coupling lens (collimator lens) 22 corresponding to each laser source 21, and enters a first optical system 23. A bundle of light rays emitted from each laser source 21 is referred to as a light flux. The first optical system 23 includes a large-diameter lens (or positive lens) 23a having a positive refractive power and a negative lens 23b. The width of the light flux is greatly reduced by the positive lens 23a, and the light flux enters the negative lens 23b.

The outer diameter of the negative lens 23b is denoted by D1 in FIG. 23. In general, the light flux is converted into substantially parallel light by the negative lens 23b. However, when the light flux emitted from the negative lens 23b is converted into condensed light and the light flux is to be reflected, the reflecting surface can be miniaturized. In addition, when the characteristics of the optical element are optimized so that the excitation light is condensed between the second optical system 25 and the light mixing element, the excitation light reflected by the phosphor unit 103, which is a wavelength conversion member, can be prevented from interfering with the reflecting surface.

When the outer diameter of the negative lens 23b is D1 and the outer diameter of a lens of the second optical system 25 on the excitation light incident side, which will be described later, is D2, it is desirable to satisfy conditional expression (1). The conditional expression (1) is an expression indicating the degree of condensing of the first optical system 23. The first optical system 23 condenses light to a large degree, thereby reducing the area of the reflecting surface, enhancing the light use efficiency of the fluorescence light, and avoiding interference of the blue light path.

0.1<D1/D2<0.6     Conditional expression (1)

If the value exceeds the upper limit value of the conditional expression (1), it becomes difficult to separate the blue optical path, so that the efficiency is lowered, and it is necessary to increase the shift amount of the optical axis. Accordingly, the distortion of the spot on the incident-side surface of the light mixing element is increased, and the utilization efficiency of the blue light is lowered. If falling below the lower limit value of the conditional expression (1), the degree of condensation of light increases, whereby the energy density on the wavelength conversion element increases and the conversion efficiency decreases.

The light flux emitted from the negative lens 23b is reflected by the reflecting surface (reflecting region) 241A of the dichroic mirror 241 and enters the second optical system 25. The second optical system 25 includes a positive lens 25A and a plano-convex lens 25B. The outer diameter of the positive lens 25A is denoted by D2. The light flux incident on the second optical system 25 is incident on one side of the positive lens 25A, passes through the positive lens 25B, and is incident on the phosphor unit 103. As described above, the phosphor unit 103 is divided into the blue reflection portion and the phosphor portion. The reflection portion reflects the excitation light, and the phosphor portion emits light having a different wavelength by the excitation light. The rotation of the phosphor unit 103 sequentially switches the reflection portion and the phosphor portion to emit excitation light and fluorescence light in a time-division manner.

Here, only the case of blue reflection is described. The excitation light reflected by the phosphor unit 103 passes through the positive lens 25B in the opposite direction, passes through the positive lens 25A, and is emitted from the second optical system 25. The excitation light emitted from the second optical system 25 enters a positive lens 27. The light flux emitted from the second optical system 25 is condensed once between the positive lens 25A and the positive lens 27. The excitation light incident on the positive lens 27 is incident on the incident-side surface of a light tunnel 29 serving as a light mixing element at an angle along the short direction of the light tunnel 29. That is, 50% or more of the rays of the first color light are first made incident on the reflecting surface having a larger area among the four reflecting surfaces constituting the light tunnel 29 serving as the light mixing element. Thus, the number of reflections in the light tunnel 29 can be increased, and the light can be made uniform even if the length of the light tunnel 29 is short.

When the length of the aperture size of the light mixing element (the light tunnel 29 in this example) in the short direction is SE, the length of the aperture size of the light mixing element in the long direction is LE, and the length of the light mixing element is L int, it is desirable to satisfy the following conditional expression (2).

6<L int/SE<12     Conditional expression (2)

If the value of L int/SE exceeds the upper limit of the conditional expression (2), the illuminance unevenness on the screen can be reduced, but the size of the apparatus is undesirably increased. If the value of L int/SE is smaller than the lower limit of the conditional expression (2), the size can be reduced, but the illuminance unevenness on the screen is undesirably increased.

In the light-source device according to the present embodiment, since the excitation light is obliquely incident on the light mixing element, luminance unevenness may occur at the exit of the light tunnel depending on the size of the light mixing element. Since the luminance unevenness directly becomes luminance unevenness on the screen, it is preferable to generate the luminance unevenness so that the image on the screen can be easily viewed.

Figure 24:
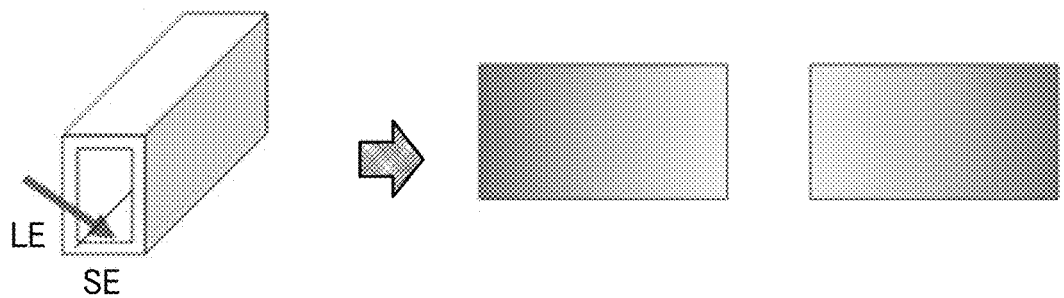
FIG. 24 is an illustration of a relationship between incidence on a light tunnel and luminance unevenness on a screen in the light-source device according to an embodiment of the present disclosure.
Figure 24:
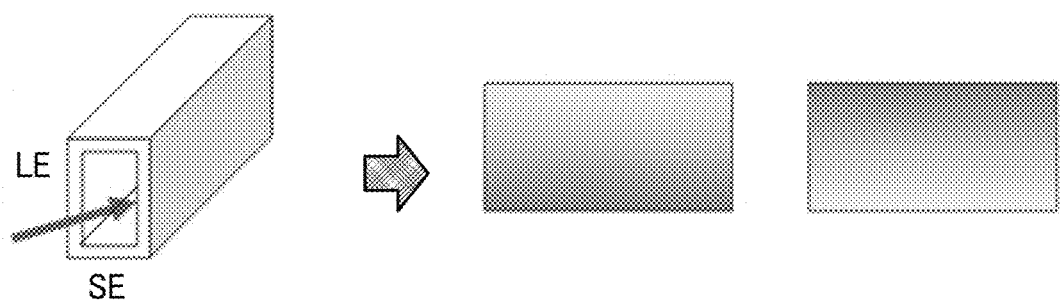

For example, in general, luminance unevenness occurring in a projection image is more preferable in the vertical direction than in the horizontal direction, and it is easier to see the projection image when the lower side close to the line of sight of a person is bright. For example, as illustrated in FIG. 24, when the excitation light is incident on a wall in the short direction, luminance unevenness or color unevenness may undesirably occur in the lateral direction on the screen. When the excitation light is incident on a wall in the long direction, luminance unevenness or color unevenness may occur in the vertical direction on the screen. Accordingly, it is easier to see a projection image when the lower side of the screen is brighter. Therefore, as illustrated in FIG. 24, it is preferable to make the excitation light incident on the light mixing element so that the lower part of the screen becomes brighter.

Lens data of the first optical system 23 and the second optical system 25 are as follows. In the table below, the surface numbers marked with * indicate aspherical surfaces. The meanings of symbols in the example are as follows:

f: focal length of entire system

R: curvature radius (paraxial curvature radius in the case of aspherical surface)

D: surface spacing

Nd: refractive index vd: Abbe number

K: Conic constant of aspherical surface

Ai: ith-order aspherical surface constant

The aspherical shape is expressed by the following known equation using the reciprocal C of the paraxial radius of curvature (paraxial curvature), the height H from the optical axis, the conic constant K, and the aspherical coefficient of each order described above, with X being the aspherical amount in the optical axis direction, and the shape is specified by giving the paraxial radius of curvature, the conic constant, and the aspherical coefficient.

$$X = \frac{C \cdot H^2}{1 + \sqrt{(1 - (1+K) \cdot C^2 \cdot H^2)}} + \sum_{i=1} Ai \cdot H^i$$

|   | R | D | Nd | Vd | Glass Material | |
|---|---|---|----|----|----|----|
| 1 | ∞ | 2.00 | | | | |
| 2 | 30.020 | 8.00 | 1.74320 | 49.3394 | S-LAM60 | OHARA |
| 3 | −211.312 | 15.50 | | | | |
| 4 | −17.456 | 2.00 | 1.48749 | 70.2363 | S-FSL5 | OHARA |
| 5 | 17.456 | 32.85 | | | | |
| 6* | 13.878 | 10.53 | 1.58913 | 61.1526 | L-BAL35 | OHARA |
| 7* | −16.334 | 0.50 | | | | |
| 8 | 9.222 | 7.70 | 1.62041 | 60.2896 | S-BSM16 | OHARA |
| 9 | ∞ | 0.70 | | | | |

Aspherical Coefficients

|  | K | A4 | A6 | A8 |
|---|---|---|---|---|
| 6th plane | −0.5587 | 3.4062E−05 | −2.4706E−07 | −2.1131E−09 |
| 7th plane | −10.8169 | 4.8564E−05 | −6.3144E−07 | 2.2753E−09 |

Data of the condenser lens are as follows. The condenser lens is disposed with a space of 32 mm from a vertex of the second optical system (condensing optical system) 25 on the incident side of the excitation light.

|  | R | D | Nd | Vd | Glass Material |  |
|---|---|---|---|---|---|---|
| 10 | 17.285 | 8.60 | 1.51633 | 64.1420 | S-BSL7 | OHARA |
| 11 | −50.077 |  |  |  |  |  |

Figure 25:
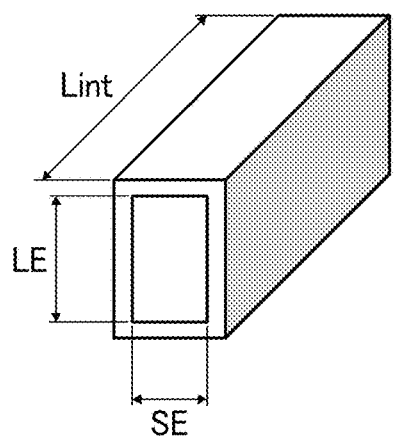
FIG. 25 is a perspective view of an example of a light mixing element according to an embodiment of the present disclosure.

The outer diameter of the lens 23b on the exit side of the first optical system 23 is 14.0 mm, and the outer diameter of the lens 25a on the incident side of the second optical system (condensing optical system) 25 is 23.5 mm. Therefore, D1/D2=0.596, which satisfies the conditional expression (1). FIG. 25 is a schematic view of a light mixing element according to the present embodiment. The aperture size in the short direction of the light mixing element, that is, the length SE is 3. 4 mm, the aperture size in the long direction of the light mixing element, that is, the length LE is 5. 7 mm, and the length L int of the light mixing element is 25 mm.

In the embodiments described above, examples of the present disclosure are described, and embodiments of the present disclosure are not limited to the configurations of the above-described embodiments. In particular, the specific shapes and numerical values of the respective parts and components illustrated in the respective embodiments are merely examples of embodiments of the present disclosure, and the technical scope of the present disclosure is not limited thereto. The present disclosure can be appropriately modified without departing from the technical idea described in the claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A light-source device, comprising:
an excitation light source configured to emit first color light;
an optical element having a reflecting surface configured to reflect the first color light emitted from the excitation light source; and
a wavelength converter including a wavelength conversion member on which the first color light reflected by the optical element is incident, the wavelength conversion member being configured to convert at least part of the first color light into second color light having a wavelength different from a wavelength of the first color light and emit the second color light,
wherein a center of the first color light on the reflecting surface of the optical element does not intersect with a light flux of the first color light emitted from the wavelength converter,
the light-source device further comprising:
a first optical system;
a second optical system having a positive power, the first optical system and the second optical system being disposed in an order of the first optical system and the second optical system from a side of the excitation light source on an optical path between the excitation light source and the wavelength converter; and
a refractive optical system and a light mixing element that are disposed on an optical path of the first color light reflected by the wavelength converter and the second color light emitted from the wavelength converter,
wherein a light flux of the first color light is emitted from the refractive optical system and is incident at an angle with respect to an incident-side surface of the light mixing element along a short direction of the light mixing element, and
wherein a shape of the incident-side surface of the light mixing element is rectangular.

2. The light-source device according to claim 1, wherein:
the light mixing element includes four reflecting surfaces, and
50% or more of rays of the first color light are first incident on a reflecting surface having a larger area than another reflecting surface among the four reflecting surfaces.

3. The light-source device according to claim 2,
wherein the first optical system is configured to emit excitation light as a condensed light flux.

4. The light-source device according to claim 2,
wherein a light condensing point of excitation light reflected by the wavelength converter is between the second optical system and the refractive optical system.

5. The light-source device according to claim 4,
wherein said optical element is disposed closer to the light condensing point than each of the second optical system and the refractive optical system is.

6. The light-source device according to claim 4,
wherein a position of the light condensing point is behind one of the reflecting surfaces or a virtual plane including said one of the reflecting surfaces in a traveling direction of a light flux.

7. The light-source device according to claim 4,
wherein another light condensing point of excitation light reflected by the optical element is between the wavelength converter and a surface of an incident side of the second optical system.

8. The light-source device according to claim 2,
wherein a relation of 0.1<D1/D2<0.6 is satisfied,
where D1 is an outer diameter of an optical element on an emission side of the first optical system and D2 is an outer diameter of an optical element on an incident side of the second optical system.

9. The light-source device according to claim 8,
wherein the first optical system is configured to emit excitation light as a condensed light flux.

10. The light-source device according to claim 8,
wherein a light condensing point of excitation light reflected by the wavelength converter is between the second optical system and the refractive optical system.

11. The light-source device according to claim 8,
wherein a light flux of the first color light is emitted from the refractive optical system as divergent light and is incident at an angle with respect to an incident-side surface of the light mixing element along the short direction of the light mixing element.

12. An image projection apparatus, comprising:
the light-source device according to claim 8;
an image display element configured to generate an image;
an illumination optical system configured to guide light emitted from the light-source device to the image display element; and
a projection optical system configured to project an image generated by the image display element, with the light guided by the illumination optical system.

13. The light-source device according to claim 2, wherein a relation of 6<L int/SE<12 is satisfied, where L int is a length of the light mixing element and SE is a length of an aperture of the light mixing element in the short direction of the light mixing element.

14. The light-source device according to claim 13, wherein the first optical system is configured to emit excitation light as a condensed light flux.

15. The light-source device according to claim 13, wherein a light condensing point of excitation light reflected by the wavelength converter is between the second optical system and the refractive optical system.

16. An image projection apparatus, comprising:
the light-source device according to claim 13;
an image display element configured to generate an image;
an illumination optical system configured to guide light emitted from the light-source device to the image display element; and
a projection optical system configured to project an image generated by the image display element, with the light guided by the illumination optical system.

17. The light-source device according to claim 1, wherein the excitation light source includes a light source unit, the light source unit including:
a plurality of laser diodes arranged in rows and columns; and
a plurality of coupling lenses on emission surface sides of the laser diodes, respectively, and
wherein an arrangement interval of the laser diodes satisfies a relation of $1 \leq p/L \tan \theta \leq 4$,
where $\theta$ is a larger one of a divergence angle in a row direction and a divergence angle in a column direction of the first color light emitted from the laser diodes, p is a pitch of adjacent ones of the laser diodes, and L is a distance from a light emission point of each of the laser diodes to a corresponding one of the coupling lenses.

18. An image projection apparatus, comprising:
the light-source device according to claim 1;
an image display element configured to generate an image;
an illumination optical system configured to guide light emitted from the light-source device to the image display element; and
a projection optical system configured to project an image generated by the image display element, with the light guided by the illumination optical system.

19. The light-source device according to claim 1, wherein:
the first color light emitted from the second optical system is incident on the refractive optical system on one side with respect to an optical axis of the refractive optical system, and passes through the refractive optical system on the one side with respect to the optical axis of the refractive optical system.

\* \* \* \* \*